(12) United States Patent
Harr et al.

(10) Patent No.: US 7,434,991 B2
(45) Date of Patent: Oct. 14, 2008

(54) THERMAL TYMPANIC THERMOMETER

(75) Inventors: James M. Harr, Foristell, MO (US); Clarence Walker, St. Louis, MO (US)

(73) Assignee: Covidien AG (CH)

( * ) Notice: Subject to any disclaimer, the term of this patent is extended or adjusted under 35 U.S.C. 154(b) by 146 days.

(21) Appl. No.: 11/419,424

(22) Filed: May 19, 2006

(65) Prior Publication Data

US 2006/0239332 A1    Oct. 26, 2006

Related U.S. Application Data

(63) Continuation-in-part of application No. 10/480,428, filed as application No. PCT/US03/11606 on Apr. 15, 2003.

(60) Provisional application No. 60/432,904, filed on Dec. 12, 2002.

(51) Int. Cl.
*G01J 5/06* (2006.01)
*G01K 1/16* (2006.01)
*A61B 5/01* (2006.01)

(52) U.S. Cl. ................. 374/121; 374/158; 600/549

(58) Field of Classification Search ............... 374/120, 374/121, 131, 133, 135, 137, 158, 163, 208; 600/474, 549
See application file for complete search history.

(56) References Cited

U.S. PATENT DOCUMENTS

| | | | |
|---|---|---|---|
| 3,491,596 A | 1/1970 | Dean | |
| 3,738,173 A | 6/1973 | Sato | |
| 4,005,605 A | 2/1977 | Michael | |
| 4,343,182 A | 8/1982 | Pompei | |
| 4,346,427 A | 8/1982 | Blissett et al. | |
| 4,456,390 A | 6/1984 | Junkert et al. | |
| 4,527,896 A | 7/1985 | Irani et al. | |
| 4,566,808 A | 1/1986 | Pompei et al. | |
| 4,588,306 A | 5/1986 | Burger et al. | |
| 4,602,642 A | 7/1986 | O'Hara et al. | |
| 4,626,686 A | 12/1986 | Pompei et al. | |
| 4,634,294 A | 1/1987 | Christol et al. | |
| 4,636,091 A | 1/1987 | Pompei et al. | |
| 4,662,360 A | 5/1987 | O'Hara et al. | |
| 4,682,898 A | 7/1987 | Janssen | |
| 4,700,324 A | 10/1987 | O'Hara et al. | |

(Continued)

FOREIGN PATENT DOCUMENTS

DE    29819056 U1    4/1999

(Continued)

OTHER PUBLICATIONS

Partial European Search Report, Application No. 07009975.9-2217, dated Sep. 20, 2007, 5 pages.

(Continued)

*Primary Examiner*—Gail Verbitsky
(74) *Attorney, Agent, or Firm*—Edward S. Jarmolowicz

(57) ABSTRACT

A tympanic thermometer includes a thermally conductive nozzle extending from a distal end of the thermometer. A base of a sensor can is thermally connected to the nozzle to define a path of conductive heat transfer from the nozzle to the base of the can thereby minimizing a thermal gradient between proximal and distal ends of the sensor can when temperature is measured in the ear.

20 Claims, 23 Drawing Sheets

U.S. PATENT DOCUMENTS

| | | |
|---|---|---|
| 4,722,612 A | 2/1988 | Junkert et al. |
| 4,784,149 A | 11/1988 | Berman et al. |
| 4,790,324 A | 12/1988 | O'Hara et al. |
| 4,797,840 A | 1/1989 | Fraden |
| 4,831,258 A | 5/1989 | Paulk et al. |
| 4,854,730 A | 8/1989 | Fraden |
| 4,867,574 A | 9/1989 | Jenkofsky |
| 4,874,253 A | 10/1989 | Pompei et al. |
| 4,895,164 A | 1/1990 | Wood |
| 4,896,039 A | 1/1990 | Fraden |
| 4,900,162 A | 2/1990 | Beckman et al. |
| 4,911,559 A | 3/1990 | Meyst et al. |
| 4,932,789 A | 6/1990 | Egawa et al. |
| 4,993,419 A | 2/1991 | Pompei et al. |
| 4,993,424 A | 2/1991 | Suszynski et al. |
| 5,012,813 A | 5/1991 | Pompei et al. |
| 5,017,018 A | 5/1991 | Iuchi et al. |
| 5,017,019 A | 5/1991 | Pompei |
| 5,018,872 A | 5/1991 | Suszynski et al. |
| 5,019,804 A | 5/1991 | Fraden |
| 5,054,936 A | 10/1991 | Fraden |
| 5,066,142 A | 11/1991 | DeFrank et al. |
| 5,081,359 A | 1/1992 | Pompei |
| 5,088,834 A | 2/1992 | Howe et al. |
| 5,119,436 A | 6/1992 | Holdgrafer |
| 5,127,742 A | 7/1992 | Fraden |
| 5,150,969 A | 9/1992 | Goldberg et al. |
| 5,159,936 A | 11/1992 | Yelderman et al. |
| 5,163,418 A | 11/1992 | Fraden et al. |
| 5,178,464 A | 1/1993 | Fraden |
| 5,183,337 A | 2/1993 | Pompei |
| 5,199,436 A | 4/1993 | Pompei et al. |
| 5,229,612 A | 7/1993 | Pompei et al. |
| 5,271,407 A | 12/1993 | Pompei et al. |
| 5,293,347 A | 3/1994 | Ogawa |
| 5,293,862 A | 3/1994 | O'Hara et al. |
| 5,293,877 A | 3/1994 | O'Hara et al. |
| 5,319,202 A | 6/1994 | Pompei |
| 5,325,863 A | 7/1994 | Pompei |
| 5,333,784 A | 8/1994 | Pompei |
| 5,368,038 A | 11/1994 | Fraden |
| 5,381,796 A | 1/1995 | Pompei |
| 5,411,032 A | 5/1995 | Esseff et al. |
| 5,445,158 A | 8/1995 | Pompei |
| 5,469,855 A | 11/1995 | Pompei et al. |
| 5,626,139 A | 5/1997 | Szeles et al. |
| 5,645,349 A | 7/1997 | Fraden |
| 5,645,350 A | 7/1997 | Jang |
| 5,653,239 A | 8/1997 | Pompei et al. |
| 5,707,343 A | 1/1998 | O'Hara et al. |
| 5,820,264 A | 10/1998 | Tsau et al. |
| 5,826,982 A | 10/1998 | Schieferdecker et al. |
| 5,874,736 A | 2/1999 | Pompei |
| 6,076,962 A | 6/2000 | Chen |
| 6,109,782 A | 8/2000 | Fukura et al. |
| 6,129,673 A | 10/2000 | Fraden |
| 6,139,182 A | 10/2000 | Levatter et al. |
| 6,149,297 A | 11/2000 | Beerwerth et al. |
| 6,149,298 A | 11/2000 | Kraus et al. |
| 6,179,785 B1 | 1/2001 | Martinosky et al. |
| 6,186,959 B1 | 2/2001 | Canfield et al. |
| 6,195,581 B1 | 2/2001 | Beerwerth et al. |
| 6,219,573 B1* | 4/2001 | Pompei ............ 600/474 |
| 6,224,256 B1 | 5/2001 | Bala |
| 6,241,384 B1 | 6/2001 | Pompei et al. |
| 6,292,685 B1 | 9/2001 | Pompei |
| 6,332,090 B1 | 12/2001 | DeFrank et al. |
| 6,357,909 B1 | 3/2002 | Wantanbe |
| 6,386,757 B1 | 5/2002 | Konno |
| 6,390,671 B1 | 5/2002 | Tseng |
| 6,435,711 B1 | 8/2002 | Gerlitz |
| D464,555 S | 10/2002 | Weinerman et al. |
| 6,485,433 B1 | 11/2002 | Peng |
| 6,572,264 B1 | 6/2003 | Egawa |
| 6,609,823 B2* | 8/2003 | Kraus et al. ............ 374/131 |
| 6,626,835 B1 | 9/2003 | Kraus |
| 6,637,931 B2 | 10/2003 | Lee et al. |
| 6,694,174 B2 | 2/2004 | Kraus et al. |
| 6,749,334 B2* | 6/2004 | Lin ............ 374/121 |
| 6,811,306 B2* | 11/2004 | Gerlitz ............ 374/121 |
| 6,886,979 B2 | 5/2005 | Conforti |
| 6,890,096 B2 | 5/2005 | Tokita et al. |
| 6,898,457 B1 | 5/2005 | Kraus et al. |
| 6,932,775 B2 | 8/2005 | Pompei et al. |
| 6,939,038 B2 | 9/2005 | Hsieh |
| 6,950,028 B2 | 9/2005 | Zweig |
| 6,964,514 B2 | 11/2005 | Land |
| 6,964,515 B2 | 11/2005 | Asakura et al. |
| 6,976,783 B2 | 12/2005 | Chen |
| 6,979,121 B2 | 12/2005 | Chang et al. |
| 6,979,122 B2 | 12/2005 | Yu |
| 6,981,796 B2 | 1/2006 | Hsieh |
| 6,983,753 B1 | 1/2006 | Lenhard et al. |
| 6,991,368 B2 | 1/2006 | Gerlitz |
| 2001/0019574 A1 | 9/2001 | Pompei et al. |
| 2002/0176478 A1 | 11/2002 | Tabata |
| 2002/0176479 A1 | 11/2002 | Hur et al. |
| 2002/0181539 A1 | 12/2002 | Sato et al. |
| 2002/0186746 A1 | 12/2002 | Tomioka et al. |
| 2003/0067958 A1 | 4/2003 | Jang |
| 2004/0022297 A1 | 2/2004 | Tabata et al. |
| 2004/0028116 A1 | 2/2004 | Lin |
| 2004/0047392 A1 | 3/2004 | Wu et al. |
| 2004/0086011 A1 | 5/2004 | Kraus et al. |
| 2004/0228386 A1 | 11/2004 | Tabata et al. |
| 2004/0233968 A1 | 11/2004 | Tabata et al. |
| 2004/0240516 A1 | 12/2004 | Harr |
| 2005/0018749 A1 | 1/2005 | Sato et al. |
| 2005/0083991 A1 | 4/2005 | Wong |
| 2005/0083994 A1 | 4/2005 | Wawro et al. |
| 2005/0085733 A1 | 4/2005 | Wong |
| 2005/0089078 A1 | 4/2005 | Hollander et al. |
| 2005/0094705 A1 | 5/2005 | Chi |
| 2005/0094707 A1 | 5/2005 | Lee et al. |
| 2005/0117624 A1 | 6/2005 | Hollander et al. |
| 2005/0157775 A1 | 7/2005 | Chapman |
| 2005/0169347 A1 | 8/2005 | Kuo |
| 2005/0185694 A1 | 8/2005 | Hollander |
| 2005/0185695 A1 | 8/2005 | Hollander et al. |
| 2005/0201444 A1 | 9/2005 | Hollander et al. |
| 2005/0207470 A1 | 9/2005 | Bennett et al. |
| 2005/0209516 A1 | 9/2005 | Fraden |
| 2005/0226307 A1 | 10/2005 | Lussier et al. |
| 2005/0245839 A1 | 11/2005 | Stivoric et al. |
| 2005/0276308 A1 | 12/2005 | Pint |
| 2005/0281314 A1 | 12/2005 | Fraden |
| 2006/0007984 A1 | 1/2006 | Bellifernine |
| 2006/0050769 A1* | 3/2006 | Lee ............ 374/208 |
| 2006/0098709 A1 | 5/2006 | Huang |
| 2006/0153278 A1* | 7/2006 | Chen et al. ............ 374/208 |
| 2006/0198424 A1* | 9/2006 | Chen et al. ............ 374/208 |

FOREIGN PATENT DOCUMENTS

| | | |
|---|---|---|
| DE | 29902276 U1 | 5/1999 |
| DE | 29907098 U1 | 9/1999 |
| EP | 0201790 A2 | 11/1986 |
| EP | 1081475 A2 | 3/2001 |
| EP | 1118306 A1 | 7/2001 |
| EP | 1239271 A1 | 11/2002 |
| EP | 1260172 A2 | 11/2002 |
| EP | 1521070 | 4/2005 |
| JP | 2005128031 A | 5/2005 |
| JP | 2005128032 A | 5/2005 |

| | | | |
|---|---|---|---|
| JP | 2005128033 A | 5/2005 | |
| JP | 2005128034 A | 5/2005 | |
| WO | 9005902 A1 | 5/1990 | |
| WO | 9522928 A1 | 8/1995 | |
| WO | 0016046 A2 | 3/2000 | |
| WO | 0058703 A1 | 10/2000 | |
| WO | 02073144 A1 | 3/2001 | |
| WO | WO 2004/055488 A | 7/2004 | |
| WO | 2005029021 A1 | 3/2005 | |

OTHER PUBLICATIONS

Hebbar, Kiran, et al., "Comparison of Temporal Artery Thermometer to Standard Temperature Measurements in Pediatric Intensive Care Unit Patients," Pediatric Critical Care Medicine, vol. 6, No. 5, Sep. 2005, 5 pages.

Mohammad-Irfan Suleman, et al, "Insufficiency in a New Temporal-Artery Thermometer for Adult and Pediatric Patients," Anesthesia Analgesia, vol. 95, No. 1, Jan. 2002, 5 pages.

Extended European Search Report, Application No. 07009975.9-2217, dated Dec. 6, 2007, 9 pages.

Extended European Search Report, Application No. 07012177.7-2217, dated Sep. 4, 2007, 7 pages.

* cited by examiner

FIG. 17

| TIME (Seconds) | Node Temp. Thermistor | Node Temp. Can Side | Delta Therm-Side | Node Temp. Can Top | Delta Therm-Top |
|---|---|---|---|---|---|
| 2.67E-03 | 20 | 20 | 0 | 20.0002 | -0.0002 |
| 9.34E-02 | 20.0009 | 20.0122 | -0.0113 | 20.0799 | -0.079 |
| 0.61783 | 20.3352 | 20.3704 | -0.0352 | 20.5684 | -0.2332 |
| 1.1423 | 21.1431 | 21.0423 | 0.1008 | 21.0568 | 0.0863 |
| 1.6667 | 22.0489 | 21.833 | 0.2159 | 21.666 | 0.3829 |
| 2.1912 | 22.8907 | 22.6231 | 0.2676 | 22.3634 | 0.5273 |
| 2.7156 | 23.6296 | 23.361 | 0.2686 | 23.0852 | 0.5444 |
| 3.2401 | 24.267 | 24.0278 | 0.2392 | 23.7837 | 0.4833 |
| 3.7645 | 24.8149 | 24.6198 | 0.1951 | 24.4318 | 0.3831 |
| 4.289 | 25.2867 | 25.1406 | 0.1461 | 25.0179 | 0.2688 |
| 4.8134 | 25.6944 | 25.5967 | 0.0977 | 25.5396 | 0.1548 |
| 5.3379 | 26.0488 | 25.9957 | 0.0531 | 26 | 0.0488 |
| 5.8623 | 26.3586 | 26.3452 | 0.0134 | 26.4044 | -0.0458 |
| 6.3868 | 26.6313 | 26.6523 | -0.021 | 26.7594 | -0.1281 |
| 6.9112 | 26.8732 | 26.9236 | -0.0504 | 27.0715 | -0.1983 |
| 7.4356 | 27.0895 | 27.1645 | -0.075 | 27.3468 | -0.2573 |
| 7.9601 | 27.2844 | 27.3799 | -0.0955 | 27.5909 | -0.3065 |
| 8.4845 | 27.4614 | 27.5739 | -0.1125 | 27.8085 | -0.3471 |
| 9.009 | 27.6235 | 27.75 | -0.1265 | 28.0039 | -0.3804 |
| 9.5334 | 27.7731 | 27.9109 | -0.1378 | 28.1805 | -0.4074 |
| 10 | 27.8972 | 28.0434 | -0.1462 | 28.3245 | -0.4273 |

THERMAL TYMPANIC THERMOMETER

CROSS REFERENCE TO RELATED APPLICATION

This application is a continuation-in-part of co-pending U.S. patent application Ser. No. 10/480,428 filed Dec. 10, 2003, which is a national stage application of PCT Application Ser. No. PCT/US03/11606 filed Apr. 15, 2003, which is the nonprovisional application of U.S. Provisional Application No. 60/432,904 filed Dec. 12, 2002, the disclosures of which are incorporated herein by reference in their entireties.

BACKGROUND OF THE INVENTION

The present disclosure generally relates to the field of biomedical thermometers, and more particularly, to a tympanic thermometer that includes a sensor having a nozzle disposed therewith that improves accuracy of temperature measurement.

Medical thermometers are typically employed to facilitate the prevention, diagnosis and treatment of diseases, body ailments, etc. for humans and other animals, as is known. Doctors, nurses, parents, care providers, etc. utilize thermometers to measure a subject's body temperature for detecting a fever, monitoring the subject's body temperature, etc. An accurate reading of a subject's body temperature is required for effective use and should be taken from the internal or core temperature of a subject's body. Several thermometer devices are known for measuring a subject's body temperature, such as, for example, glass, electronic, ear (tympanic).

Glass thermometers, however, are very slow in making measurements, typically requiring several minutes to determine body temperature. This can result in discomfort to the subject, and may be very troublesome when taking the temperature of a small child or an invalid. Further, glass thermometers are susceptible to error and are typically accurate only to within a degree.

Electronic thermometers minimize measurement time and improve accuracy over glass thermometers. Electronic thermometers, however, still require approximately thirty (30) seconds before an accurate reading can be taken and may cause discomfort in placement as the device must be inserted into the subject's mouth, rectum or axilla.

Tympanic thermometers are generally considered by the medical community to be superior for taking a subject's temperature. Tympanic thermometers provide rapid and accurate readings of core temperature, overcoming the disadvantages associated with other types of thermometers. Tympanic thermometers measure temperature by sensing infrared emissions from the tympanic membrane (eardrum) in the external ear canal. The temperature of the tympanic membrane accurately represents the body's core temperature. Further, measuring temperature in this manner only requires a few seconds.

Known tympanic thermometers typically include a probe containing a heat sensor such as a thermopile, a pyroelectric heat sensor, etc. During use, the heat sensor is generally located outside the eardrum and utilizes a waveguide of radiant heat to transfer heat energy from the eardrum to the sensor. See, for example, U.S. Pat. Nos. 6,179,785, 6,186,959, and 5,820,264. These types of heat sensors are particularly sensitive to the eardrum's radiant heat energy.

In operation, a tympanic thermometer is prepared for use and a probe cover is mounted onto a sensing probe extending from a distal portion of the thermometer. The probe covers are hygienic to provide a sanitary barrier and are disposable after use. A practitioner or other care provider inserts a portion of the probe having the probe cover mounted thereon within a subject's outer ear canal to sense the infrared emissions from the tympanic membrane. The infrared light emitted from the tympanic membrane passes through a window of the probe cover and is directed to the sensing probe by a waveguide. The window is typically a transparent portion of the probe cover and has a wavelength in the far infrared range. The probe cover should provide for the easy and comfortable insertion of the probe into the ear canal.

The practitioner presses a button or similar device to cause the thermometer to take a temperature measurement. The microelectronics process electrical signals provided by the heat sensor to determine eardrum temperature and render a temperature measurement in a few seconds or less. The probe is removed from the ear canal and the probe cover is removed and discarded.

Many tympanic thermometers measure radiation being emitted from an object, such as the tympanic membrane, by employing a thermopile sensor. A membrane inside the thermopile sensor absorbs incoming radiation, which raises the temperature of the membrane. The hot junctions of thermocouples, which may be very small, are placed onto the membrane while the cold junction is thermally connected to a sensor body of the thermopile sensor. The thermocouples output a voltage change that is proportional to the temperature change between the hot and cold junctions of the thermocouple. This voltage change can be correlated to the Stefan-Boltzmann law for emitted radiation from a black body (represented in formulaic, $V_{out}=K(eT^4_{obj}-T^4_{sens})$).

Errors in temperature readings taken by known tympanic thermometers often occur because the temperature of the sensor body is changing due to changing ambient temperature situations. These changing ambient temperature situations include other factors that affect the temperature of the thermopile sensor. For example, when a tympanic thermometer at room temperature is placed in the human ear, heat transfers to the thermopile sensor and other portions of the tympanic thermometer. The thermopile sensor includes sensor optics and a sensor can. The sensor optics and can temperature are caused to increase very rapidly and thus emit radiation back to the membrane inside the thermopile sensor. Since the temperature of the sensor is measured back at the proximal end of the thermopile sensor, $T_{sens}$ will not reflect the actual temperature of the thermopile sensor and therefore an error will be introduced to the temperature measurement.

Transferring some known tympanic thermometers from a room temperature setting to a different temperature setting in the human ear is a changing ambient environment. In these types of changing ambient environments, data from thermal analysis and lab testing has shown temperature changes across the thermopile sensor can range as high as 1.5-2.5 degrees Celsius using known nozzle configurations that are disposed with the sensors of these tympanic thermometers. Devices of this kind may disadvantageously take inaccurate temperature readings resulting in drawbacks for treating and diagnosing patients.

Therefore, it would be desirable to overcome the disadvantages and drawbacks of the prior art with a tympanic thermometer that includes a sensor having a nozzle disposed therewith that improves accuracy of temperature measurement. It is contemplated that the tympanic thermometer and its constituent parts are easily and efficiently manufactured and assembled.

SUMMARY OF THE INVENTION

In one aspect, a tympanic thermometer having a proximal end and a distal end generally comprises a thermally conductive nozzle extending from the distal end of the thermometer. A sensor can housing temperature sensing electronics for sensing temperature includes a base thermally connected to the nozzle to define a path of conductive heat transfer from the nozzle to the base of the can. The sensor can is otherwise free of thermal connection with a thermally conductive structure of greater mass than the sensor can.

In another aspect, a tympanic thermometer having a proximal end and a distal end comprises a thermally conductive nozzle extending from the distal end of the thermometer. A sensor can housing temperature sensing electronics for sensing temperature includes a base thermally connected to the nozzle to define a path of conductive heat transfer from the nozzle to the base of the can. The nozzle and the sensor can are constructed and arranged to define a heat transfer path from the nozzle to the sensor can and to inhibit heat transfer away from the sensor can, thereby minimizing a thermal gradient between proximal and distal ends of the sensor can when temperature is measured in the ear.

In yet another aspect, a tympanic thermometer having a proximal end and a distal end comprises a thermally conductive nozzle extending from the distal end of the thermometer. The nozzle includes an internal passageway. A sensor can located generally at a distal end margin of the nozzle has a base thermally connected to the nozzle. The base of the sensor can is free of thermal connection with any heat sink capable of drawing heat transferred from the nozzle away from the base of the sensor can thereby to promote heat transfer from the nozzle to the sensor can base and minimize a thermal gradient between proximal and distal ends of the sensor can when temperature is measured in the ear.

In a further aspect of the present invention, a tympanic thermometer having a proximal end and a distal end generally comprises a thermally conductive nozzle extending from the distal end of the thermometer. A sensor can housing temperature sensing electronics for sensing temperature includes a base thermally connected to the nozzle. The base of the sensor can is thermally connected to the nozzle to form a path for heat transfer from the nozzle to the base. The nozzle defines an air space on a proximal side of the sensor can base to inhibit heat transfer from the sensor can.

Other objects and features will be in part apparent and in part pointed out hereinafter.

BRIEF DESCRIPTION OF THE DRAWINGS

FIG. 17 is a table showing temperature response of a sensor can in a tympanic thermometer of the present invention;

Corresponding reference characters indicate corresponding parts throughout the drawings.

DETAILED DESCRIPTION

The exemplary embodiments of the tympanic thermometer and methods of use disclosed are discussed in terms of medical thermometers for measuring body temperature, and more particularly, in terms of a tympanic thermometer that includes a sensor having a nozzle disposed therewith that improves accuracy of temperature measurement. It is envisioned that the present disclosure finds application for the prevention, diagnosis and treatment of diseases, body ailments, etc. of a subject. It is further envisioned that the principles relating to the tympanic thermometer disclosed include proper removal of a used probe cover via the ejection apparatus and indication to a practitioner whether a new, unused probe is mounted to the tympanic thermometer.

Figure 2:
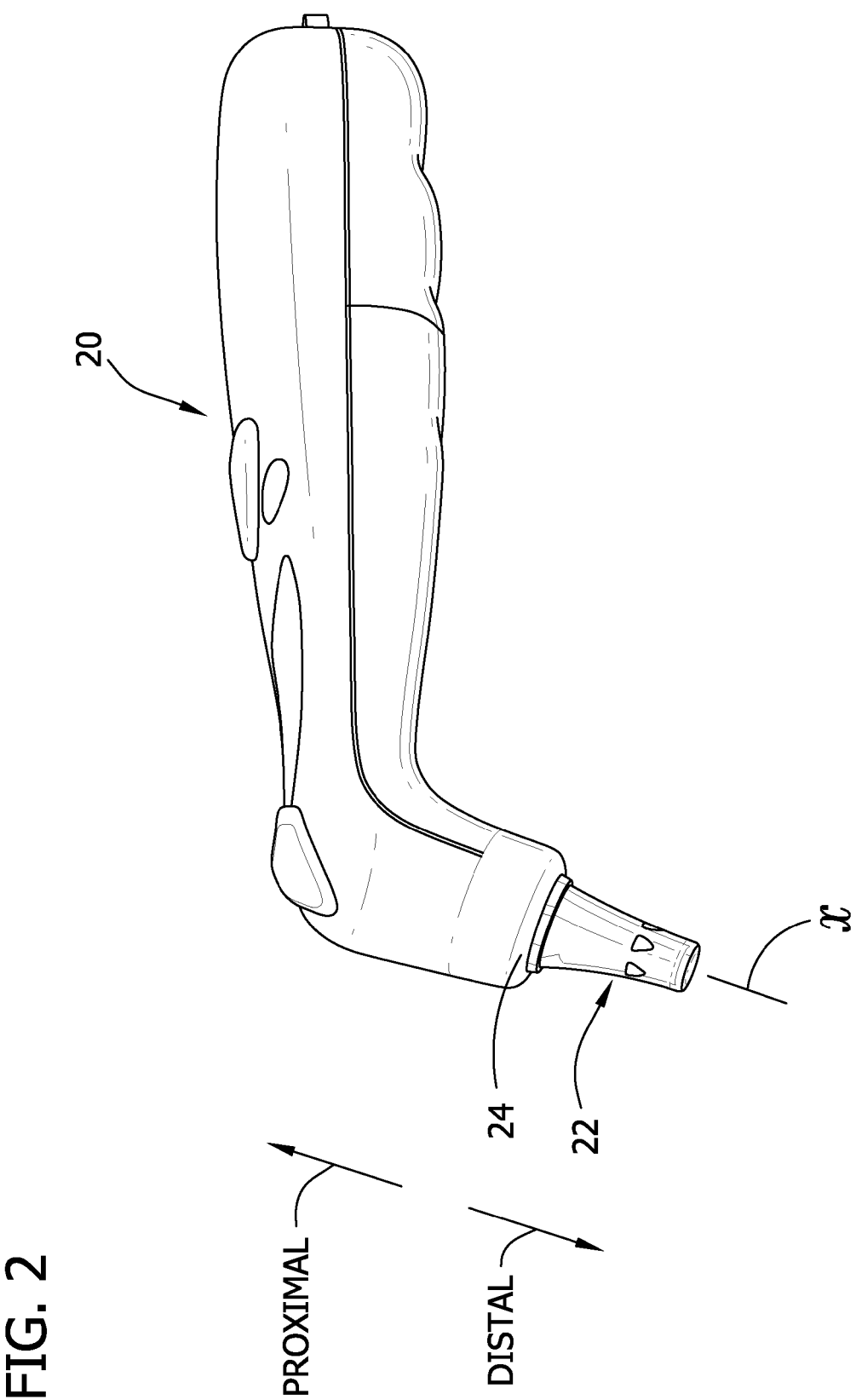
FIG. 2 is a perspective view of the tympanic thermometer shown in FIG. 1.

In the discussion that follows, the term "proximal" will refer to the portion of a structure that is closer to a practitioner, while the term "distal" will refer to the portion that is further from the practitioner. FIG. 2 illustrates "proximal" and "distal" for the structure, which is the fully assembled and usable tympanic thermometer. As-used herein, the term "subject" refers to a human patient or other animal having its body temperature measured. According to the present disclosure, the term "practitioner" refers to a doctor, nurse, parent or other care provider utilizing a tympanic thermometer to measure a subject's body temperature, and may include support personnel.

Figure 1:
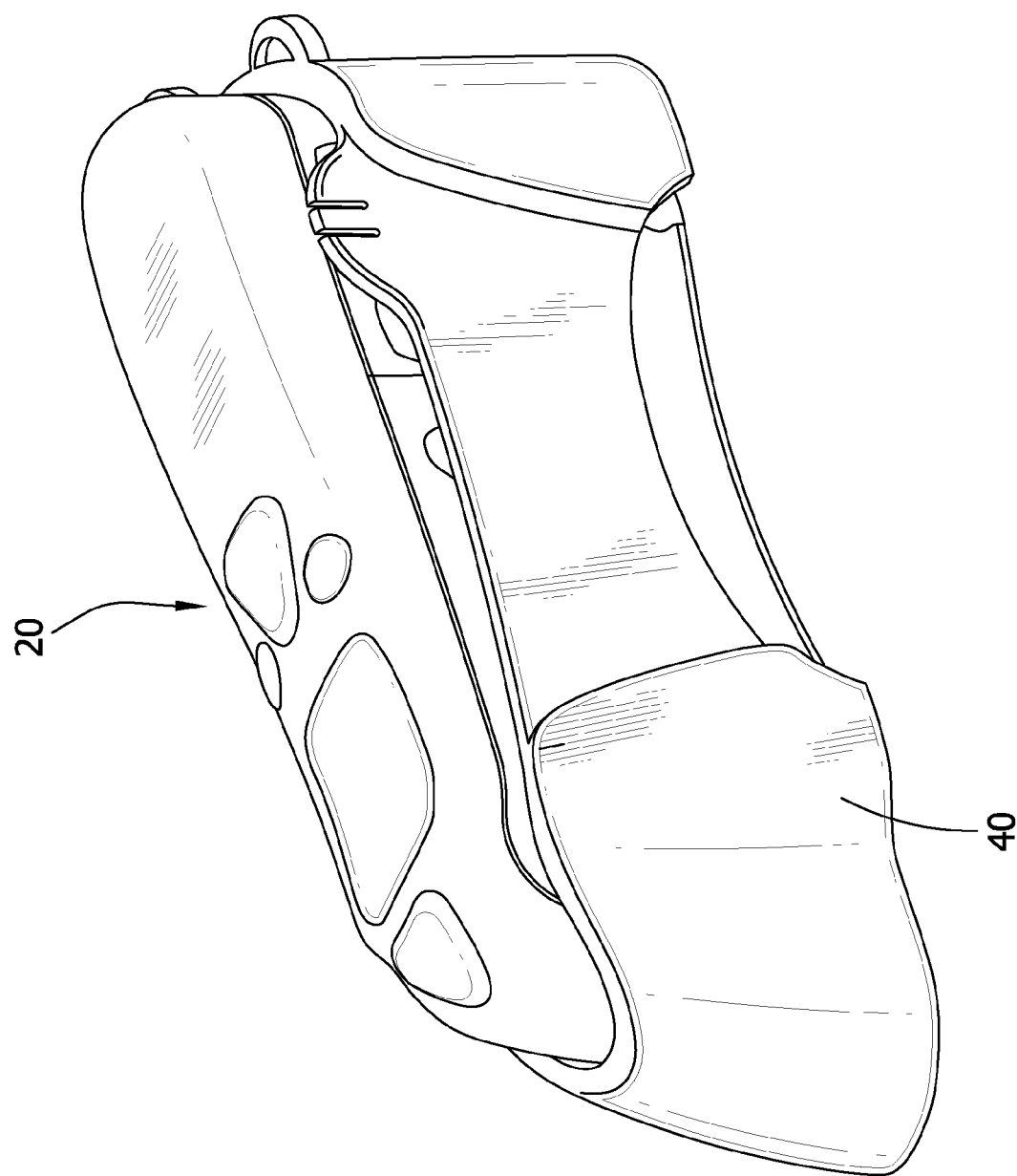
FIG. 1 is a perspective view of a tympanic thermometer, in accordance with the principles of the present disclosure, mounted with a holder.

Reference will now be made in detail to the exemplary embodiments of the present disclosure, which are illustrated in the accompanying Figures. Turning now to the Figures and initially to FIGS. 1, 2 and the attached disclosure, plots, graphs and Figures, there is illustrated a tympanic thermometer, generally indicated at 20, in accordance with the principles of the present disclosure. It is contemplated that tympanic thermometer 20 includes the necessary electronics and/or processing components to perform temperature measurement via the tympanic membrane, as is known to one skilled in the art. It is further envisioned that tympanic thermometer 20 may include a waveguide to facilitate sensing of the tympanic membrane heat energy. However, in the illustrated embodiments, the waveguide is beneficially omitted. Tympanic thermometer 20 is releasably mounted in a holder 40 for storage in contemplation for use. Tympanic thermometer 20 and holder 40 may be fabricated from semi-rigid, rigid plastic and/or metal materials suitable for temperature measurement and related use. It is envisioned that holder 40 may include the electronics necessary to facilitate powering of tympanic thermometer 20, including, for example, battery charging capability, etc.

Figure 4:
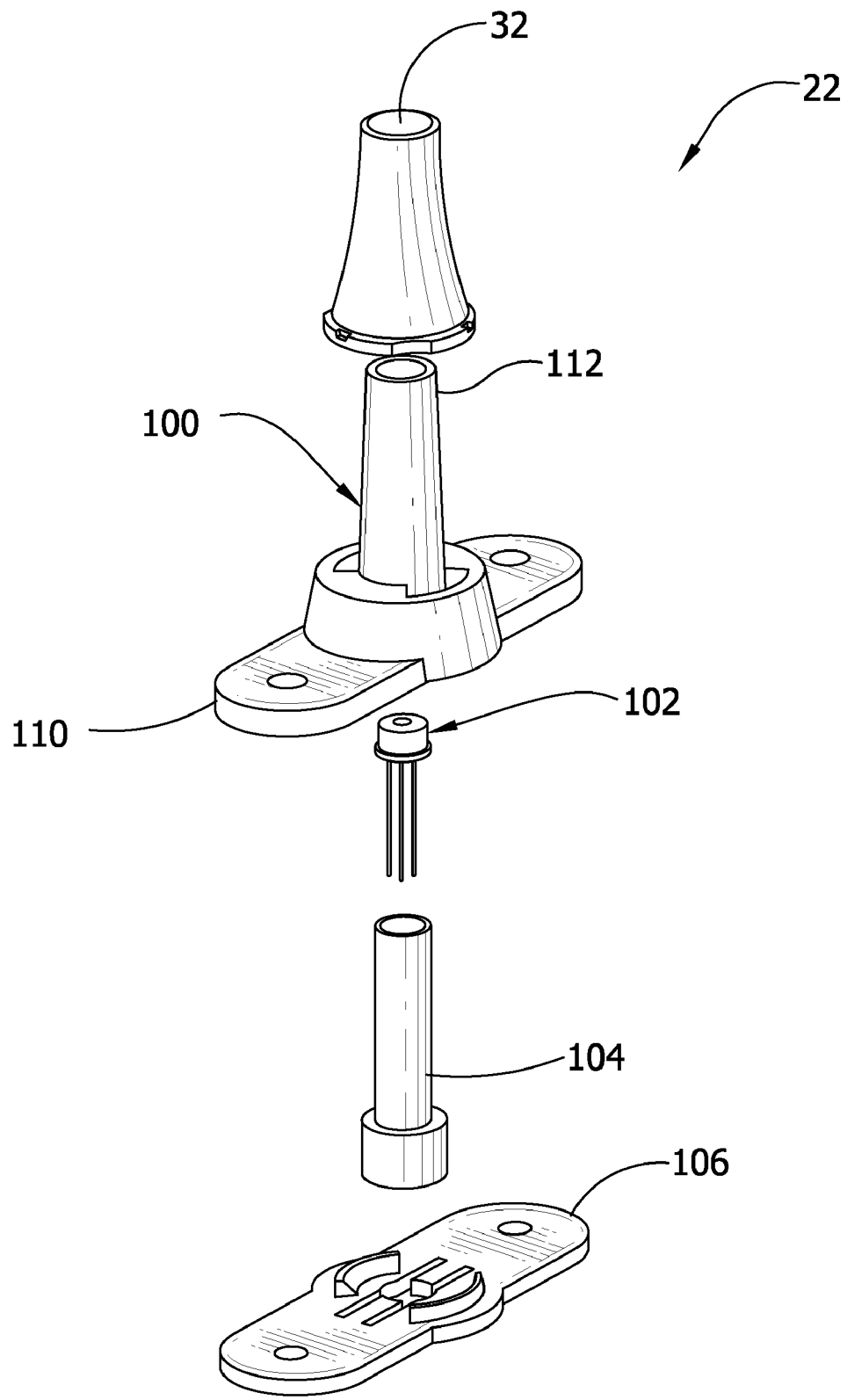
FIG. 4 is an exploded view, with parts separated, of a distal end of the tympanic thermometer shown in FIG. 2.
Figure 4A:
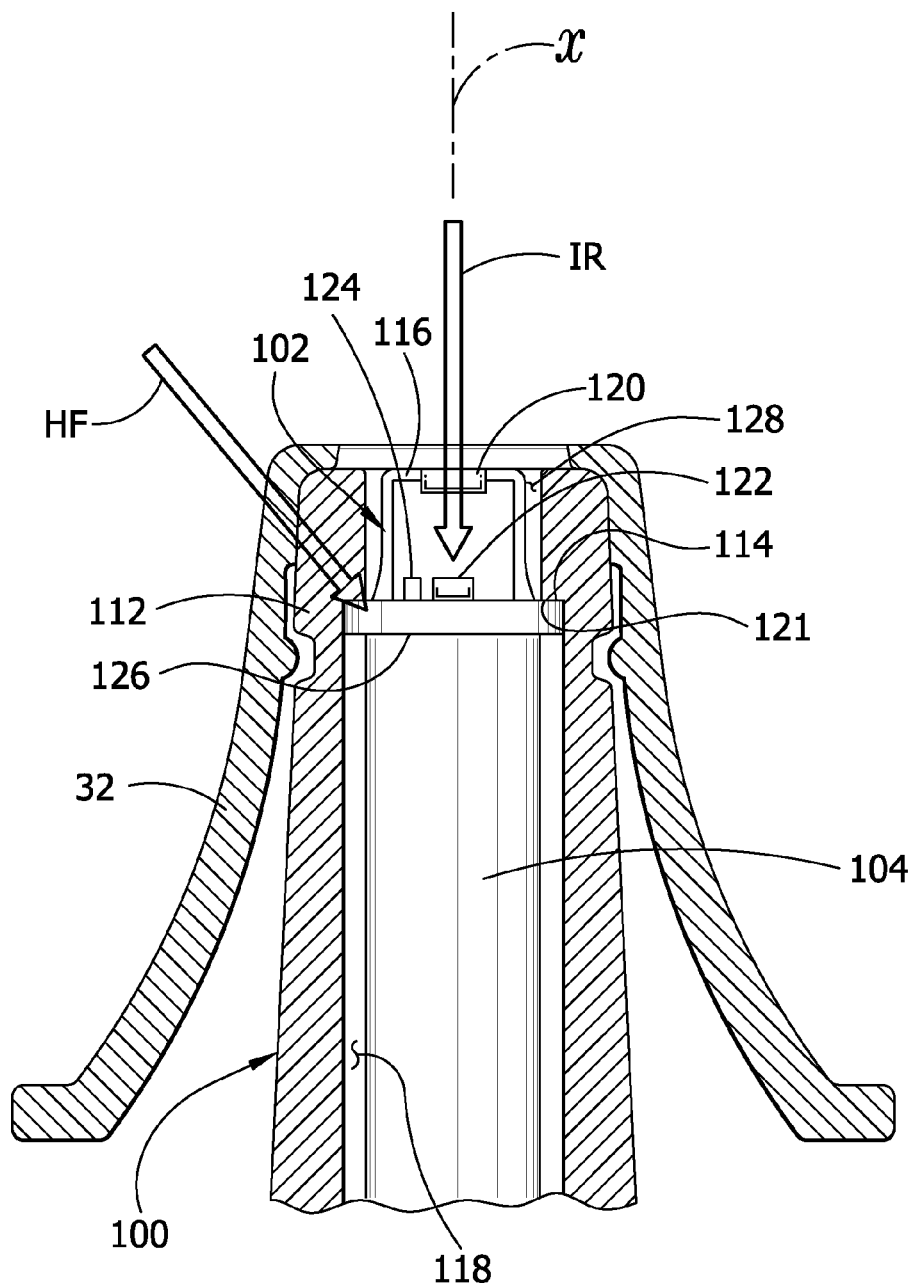
FIG. 4A is a cross-sectional view of the probe cover mounted on the distal end of the tympanic thermometer shown in FIG. 2.
Figure 5:
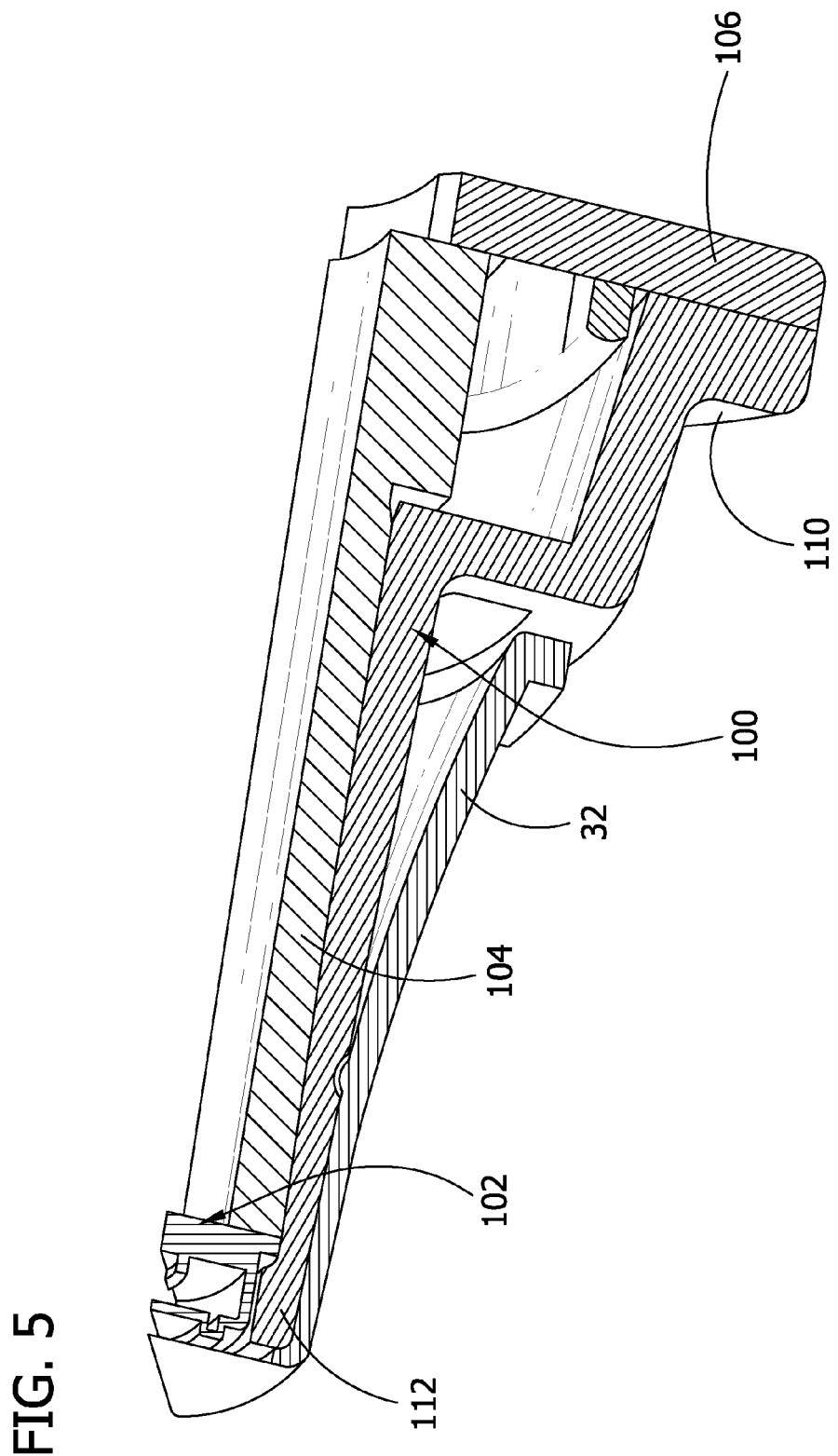
FIG. 5 is an enlarged perspective cutaway view of the distal end of the tympanic thermometer shown in FIG. 2.

Referring to FIG. 2, tympanic thermometer 20 includes a cylindrical heat sensing probe, generally indicated at 22. Heat sensing probe 22 extends from an end 24 of tympanic thermometer 20 and defines a longitudinal axis X. Heat sensing probe 22 may have various geometric cross-sectional configurations, such as, for example, rectangular, elliptical, etc. Referring to FIGS. 4, 4A and 5, heat sensing probe 22 includes a nozzle, generally indicated at 100, mounted on a base 106. The nozzle 100 includes a base 110 and an elongated nose portion 112 projecting distally from the base. By way of non-limiting example, the nozzle 100 may be fabricated from metal or other material which aides in the rapid exchange or transfer of heat. The nozzle 100 is formed of two parts (the base 110 and the nose portion 112) in the first illustrated embodiment. It will be understood that a nozzle can be formed as one piece or more than two pieces within the scope of the present invention. In particular, it is envisioned that the elongated nose section 112 can be formed of two or more pieces.

The heat sensing probe 22 also includes a sensor can, generally indicated at 102, attached to temperature sensing electronics mounted on a distal end of a sensor housing 104 (or "retainer") received within the nozzle 100. The can 102 includes a sensor base 126 and a generally inverted cup-shaped tip 116 mounted on the base. An infrared sensor 122 (e.g., a thermopile), an infrared filter or window 120 and thermistor 124 are housed within the can 102. The sensor housing 104 is mounted on the base 106 of the probe 22 such that it extends generally coaxially within the nozzle 100. By way of non-limiting example, sensor housing 104 is fabricated from materials which provide for less thermo transmission (i.e., more insulated) than nozzle 100, for example, plastic or other similar matter. Stated another way, the material of the sensor housing 104 has a low thermal conductivity as compared to the thermal conductivity of the nozzle 100 and the base 126 of the can 102. As an example and without limiting the generality of the present disclosure, thermal insulators may have a thermal conductivity (in units of $^W/_{mK}$ or watts per meter degree Kelvin) of about 0.1 $^W/_{mK}$ or less, while good thermal conductors may have a thermal conductivity of 100 $^W/_{mK}$ or more. Generally speaking, metals (e.g., aluminum, brass or copper) are superior thermal conductors. To avoid drawing heat away from the base 126 of the sensor can 102, the base is preferably free of thermal connection to another metallic object besides the nozzle 100. As shown best in FIG. 4A, when the can 102 and the sensor housing 104 are received in the nozzle 100, a peripheral edge margin 114 of the base 126 of the can contacts an internal ridge 121 of the nozzle adjacent the nose portion 112 at the distal end. In this way, the base 126 of the can 102 is in thermal contact with the nozzle 100 at the nose portion 112 thereof. As also shown best in FIG. 4A, the remainder of the can 102 (i.e., any other portion of the can besides the base 126) does not contact any other structure. An air gap is formed between the proximal portion of the can 102 and the nose 112 of the nozzle 100. Thus, the base 126 of the can 102 is in thermal contact solely with the nozzle 100, as the sensor housing 104 is made of a thermally insulating material of low thermal conductivity. As shown, nozzle 100, sensor housing 104 and can 102 are fitted in a secure relationship. Such secure relationship may be established by way of adhesive, friction, press fitting and the like. An air gap 128 is also disposed between the nozzle 100 and sensor housing 104, providing additional thermal insulation against heat being drawn away from the base 126.

A probe cover 32 is received on the nozzle 100 such that a distal portion of the cover is in thermal contact with the nose 112 of the nozzle. Probe cover 32 may be shaped, for example, frustoconically, or shaped in a tapered manner as to allow for easier insertion into the ear of the subject and attachment and detachment from the heat sensing probe 22. The probe cover 32, which is disposable, may be fabricated from materials suitable for measuring body temperature via the tympanic membrane with a tympanic thermometer measuring apparatus. These materials may include, for example, plastic materials, such as, for example, polypropylene, polyethylene, etc., depending on the particular temperature measurement application and/or preference of a practitioner.

Figure 3:
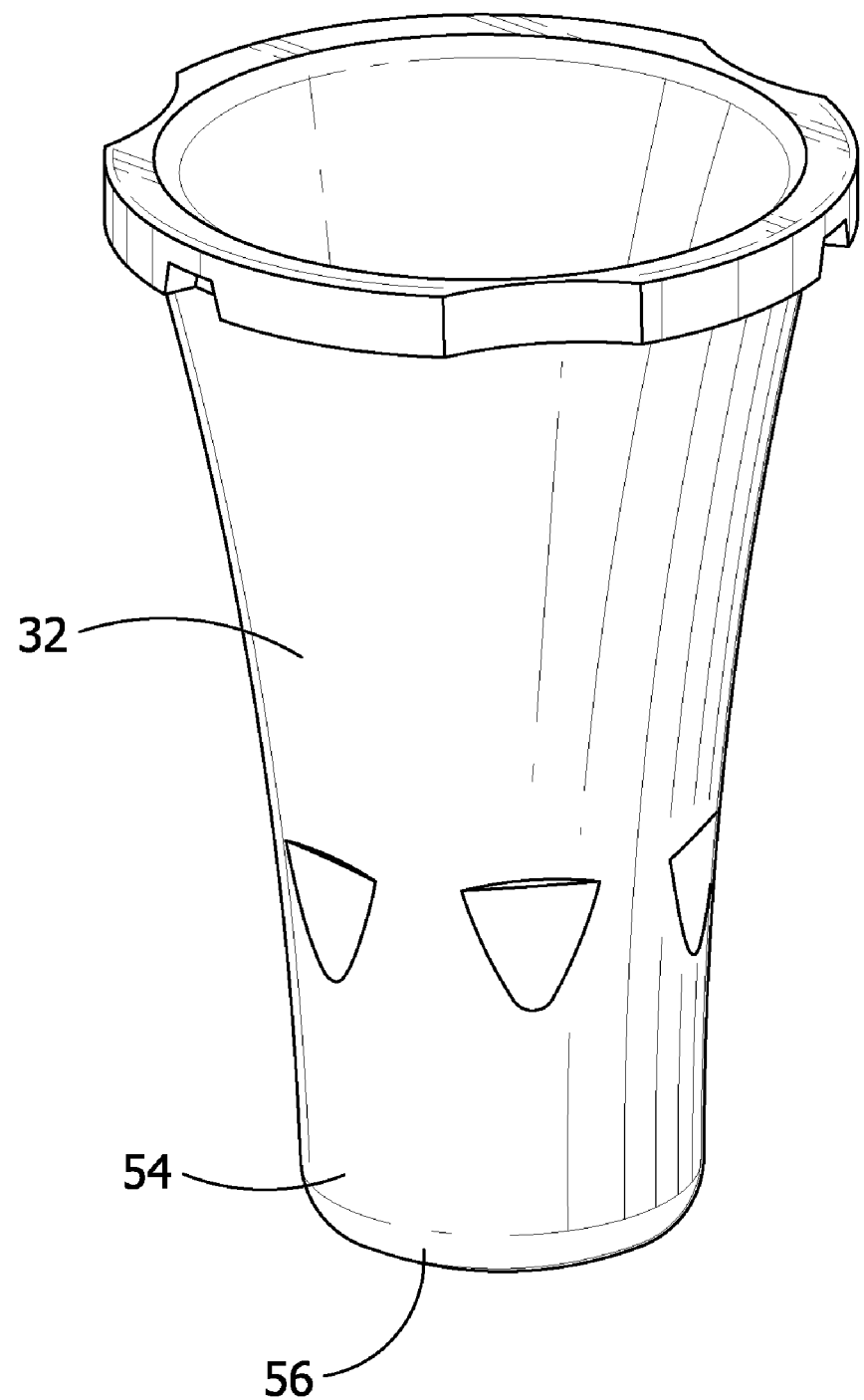
FIG. 3 is a perspective view of a probe cover intended for mounting to the tympanic thermometer shown in FIG. 2.

Referring to FIG. 3, the probe cover 32 has a distal end 54 that is substantially enclosed by a film 56. Film 56 is substantially transparent to infrared radiation and configured to facilitate sensing of infrared emissions by heat sensing probe 22. The film 56 is advantageously impervious to ear wax, moisture and bacteria to prevent disease propagation. The film 56 has a thickness in the range of 0.0005 to 0.001 inches, although other ranges are contemplated. The film 56 may be semi-rigid or flexible, and can be monolithically formed with the remaining portion of the probe cover 32 or integrally connected thereto via, for example, thermal welding, etc. One skilled in the art, however, will realize that other materials and fabrication methods suitable for assembly and manufacture, in accordance with the present disclosure, also would be appropriate.

In operation, infrared energy IR (FIG. 4A) from the subject's tympanic membrane, for example, enters the can 102 through the window 120. This infrared energy may heat the can 102 and create a temperature gradient across the tip 116 from its distal end to its proximal end contacting the base 126. That is, the distal end can be much warmer than the proximal end. Heat from, for example, the ear of the subject is transferred from probe cover 32 to nozzle 100 to the base 126 of the can 102 via a path of heat flux HF (FIG. 4A). As noted above, and as opposed to other prior art temperature sensing tips, which are designed to insulate sensing tips, the path of heat flux HF heats the can 102 in order to reduce the temperature gradient across tip 116, thereby enabling a faster and more accurate temperature reading. The internal ridge 121 engages a distal side of the peripheral edge margin 114 of the base 126 to provide a heat conducting path from the nozzle 100 to the base (illustrated by arrow HF in FIG. 4A). It is contemplated herein that nozzle 100 may be both in physical contact with the peripheral edge margin 114 or in a close proximate relationship with peripheral edge margin 114 of can 102. In either case, there should be such thermal contact as to enable heat transfer from the internal ridge 121 of the nozzle 100 to the peripheral edge margin 114 of the base 126. As shown in FIGS. 6-9 and 11-12, heat transfer to the can 102 from peripheral edge margin 114 of the base 126 can occur at any local or single point of contact (FIGS. 6-9 and 11-12 disclose such point of contact along an upper portion of the peripheral edge margin 114) or along a plurality of contact points, for example, the entire portion of the peripheral edge margin 114.

It is contemplated herein, that can 102 may have a plurality of lips, ribs or other similar structures, for example, detents, nubs, etc., which aide in the heat transfer from nozzle 100 to can 102 and ultimately to can tip 116. The peripheral edge margin 114 may also be formed in a variety of geometric configurations, e.g., helical, dashed, etc. For example, in order to reduce the temperature gradient from the peripheral edge margin 114 to tip 116, (and thus reducing the temperature gradient from internal thermistor 124 (FIG. 4A) and top of can 102), can 102 may have a plurality of ridge members (not shown) made from a metal alloy or other material. Such ridge members may be made from separate materials, may be partially in contact with the body of can 102, or otherwise be adapted to reduce the temperature gradient from peripheral edge margin 114 to can tip 116.

It is also contemplated herein, that can 102, by way of or in addition to the formations of the peripheral edge margin 114, can be pre-heated electrically or by other means to certain preset temperatures. Ridge members assist in heat transfer from nozzle 100, such that the heat gradient from the peripheral edge margin 114 to can tip 116 is reduced. This reduction in the gradient across the sensor tip of can 102 provides for faster, more accurate results.

As discussed and shown in the FIGS. 4, 4A and 5 above, sensor can 102 is situated at the distal end of the sensor housing 104 and at the distal end margin of the nozzle 100. Such relationship provides for the sensor to be included within or substantially close to the ear of a subject during a temperature reading. The waveguide of many conventional tympanic thermometers is not required. Moreover, a thermal mass or heat sink to draw heat away from the sensor can 102 is not required. The prior art discloses sensor to ear relationships of this kind; however, these prior art relationships include unique differential heating issues of the sensor. As discussed below and shown in FIGS. 6-12, the differential heating problems of the prior art have been overcome.

By way of a non-limiting example and referring to FIGS. 6-12, one embodiment of tympanic thermometer 20 includes heat sensing probe 22 at an initial temperature of 20° C. when a 40° C. temperature load is applied to the outside surface of probe cover 32. This is similar to taking heat sensing probe 22 from room temperature and disposing it within the ear of a human subject with a fever. As shown, radiation effects are applied to the top face of sensor housing 104 and nozzle 100. A transient analysis was run for ten (10) seconds for an aluminum nozzle design with a sensor contact.

Figure 6:
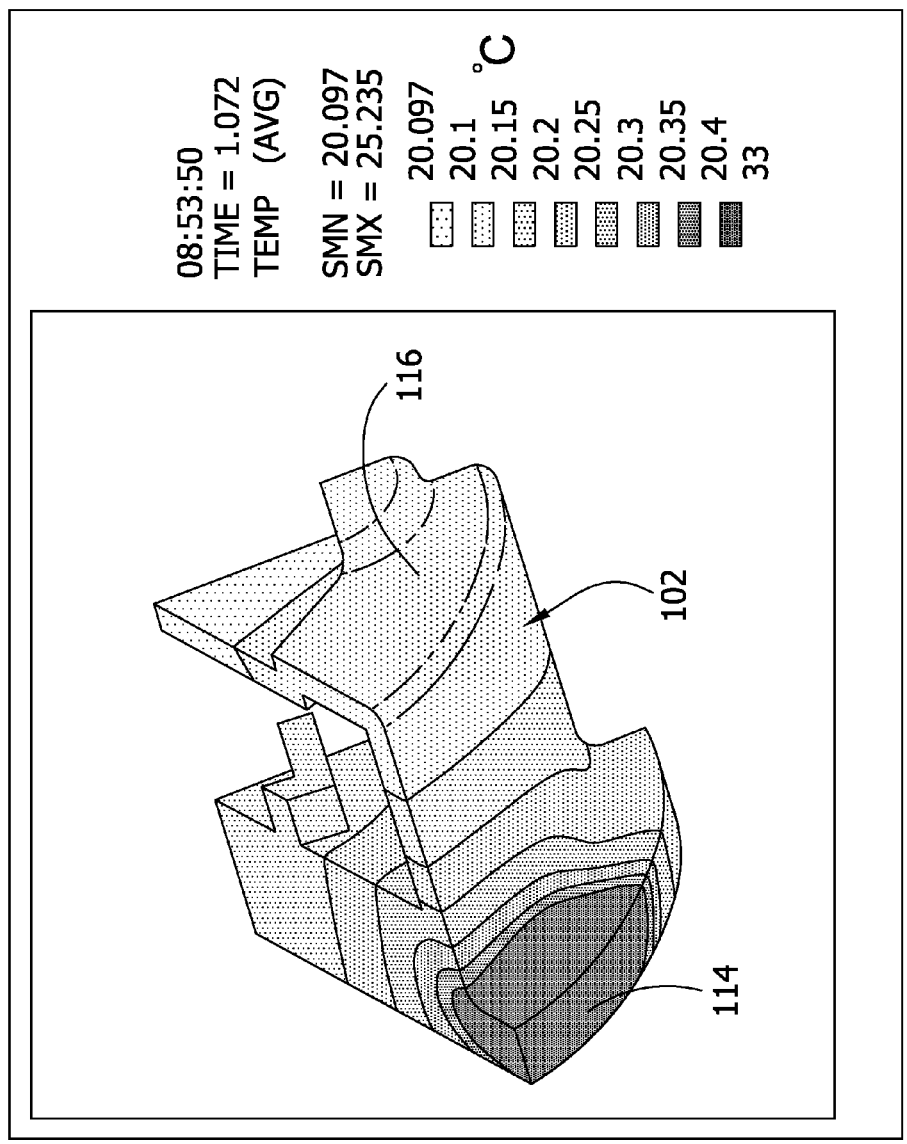
FIG. 6 is a temperature gradient plot of a sensor can in one embodiment of the tympanic thermometer, in accordance with the present disclosure measured at 1.072 seconds after heat has been applied.
Figure 7:
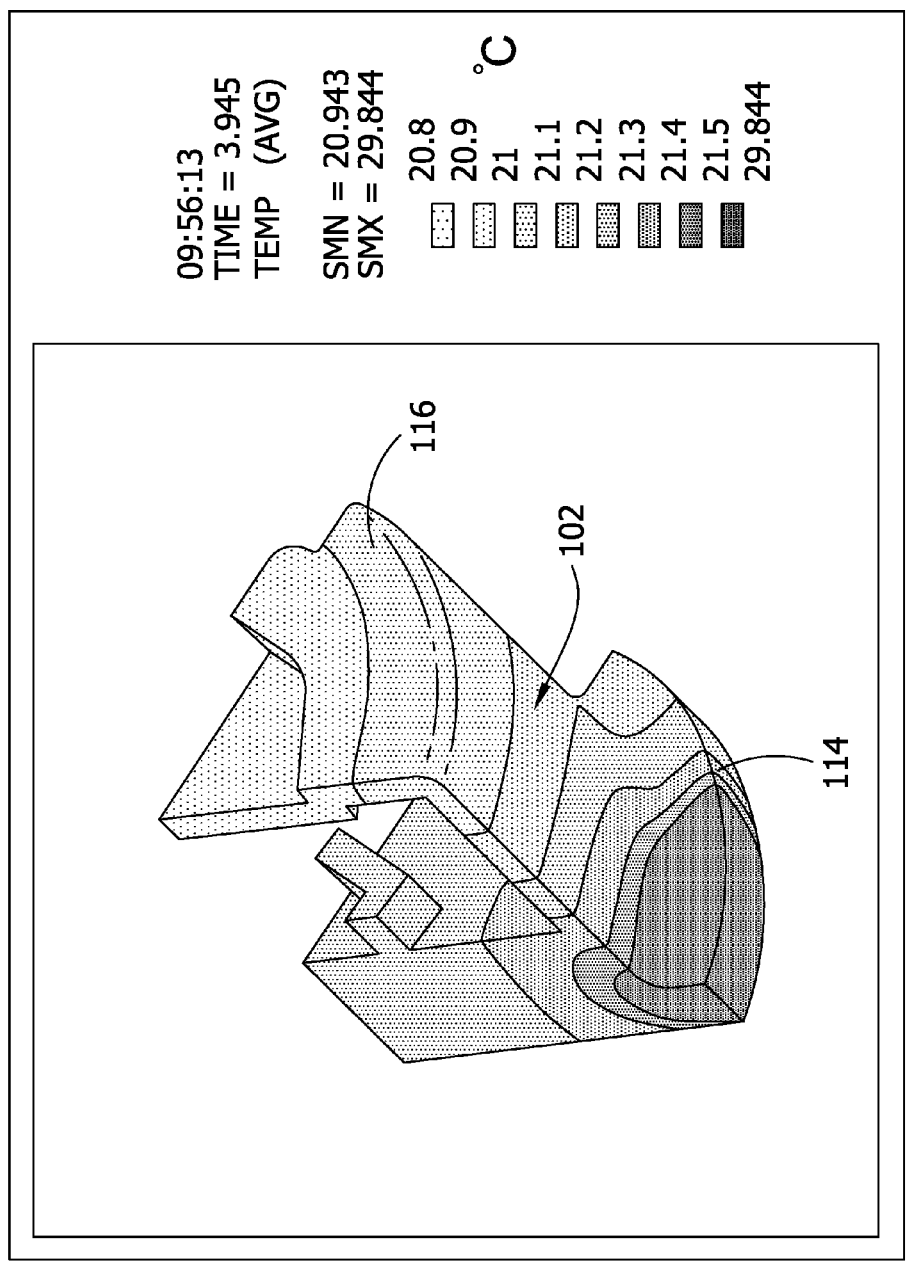
FIG. 7 is a temperature gradient plot of the sensor can shown in FIG. 6 measured at 3.945 seconds after heat has been applied.
Figure 8:
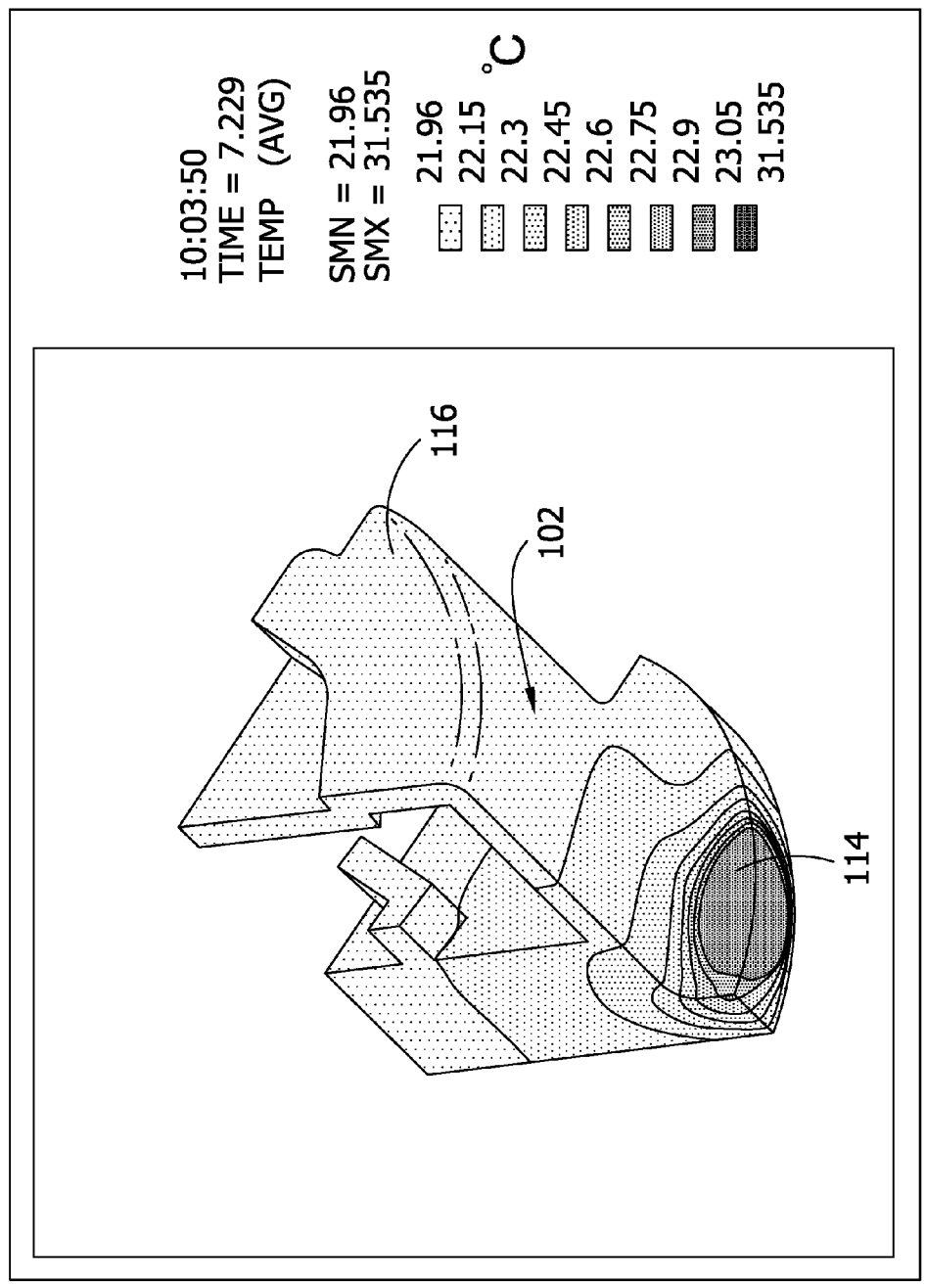
FIG. 8 is a temperature gradient plot of the sensor can shown in FIG. 6 measured at 7.229 seconds after heat has been applied.
Figure 9:
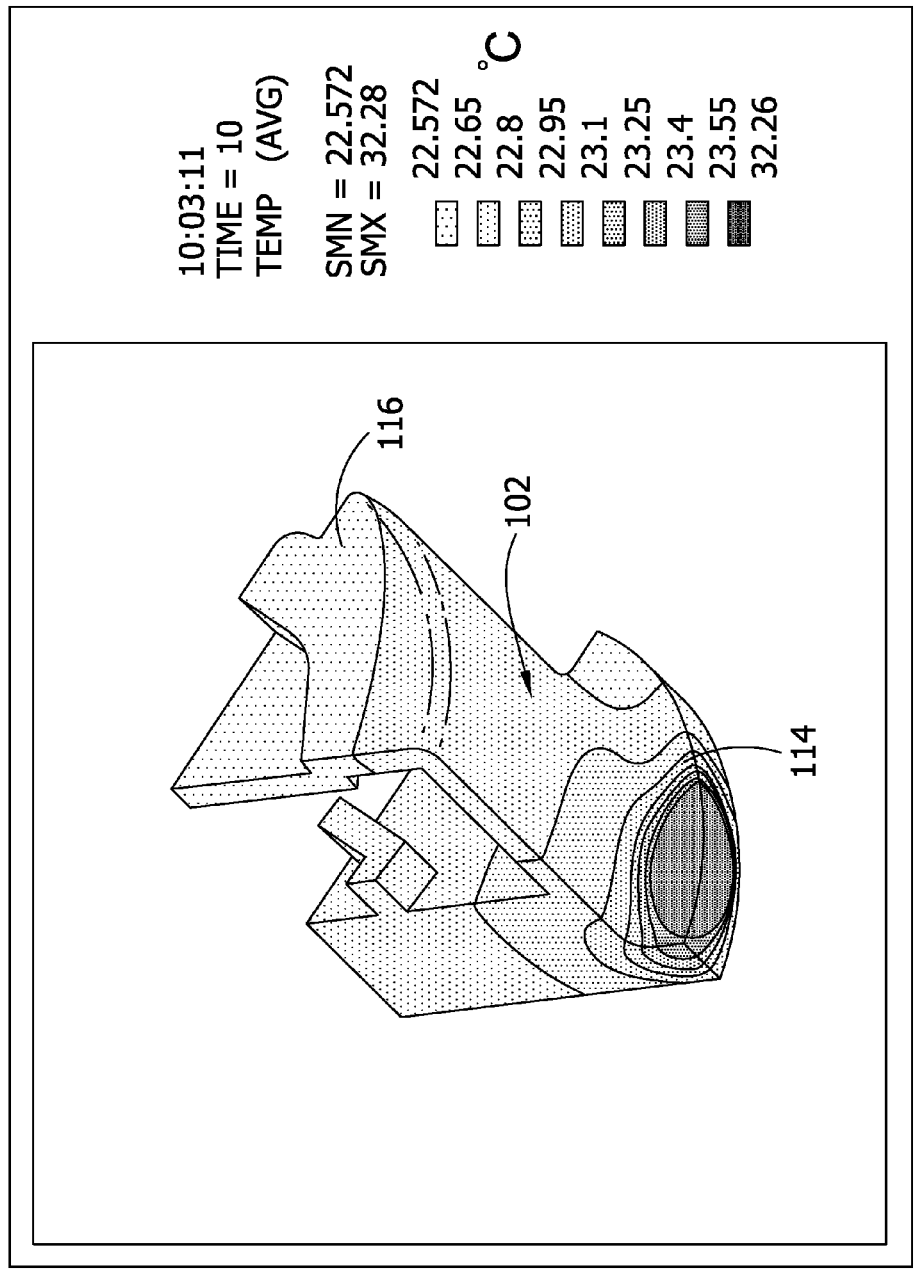
FIG. 9 is a temperature gradient plot of the sensor can shown in FIG. 6 measured at 10 seconds after heat has been applied.
Figure 10:
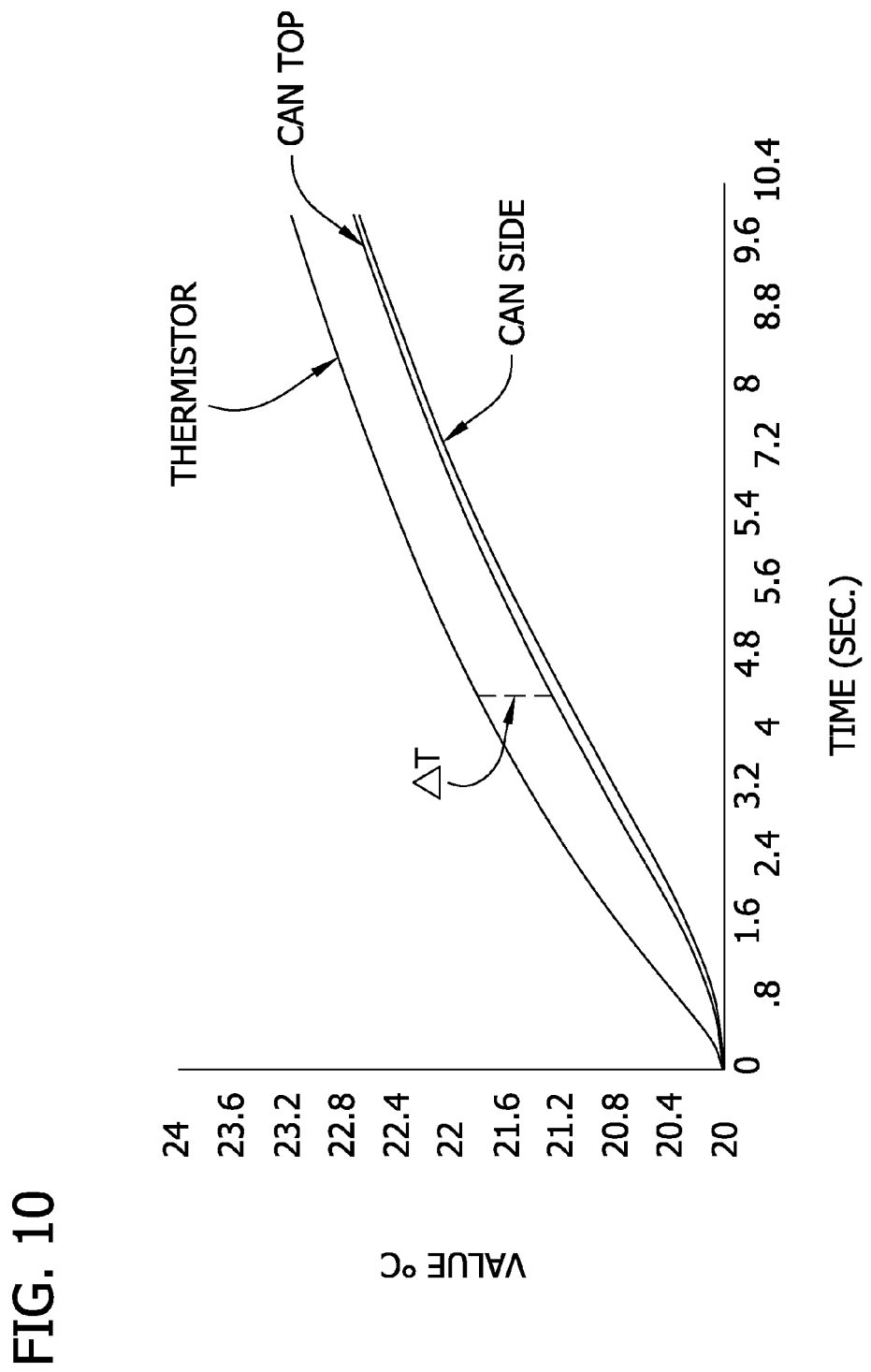
FIG. 10 is a time versus temp graph of locations of the sensor temperatures of the sensor can for the time periods shown in FIG. 6-9.
Figure 11:
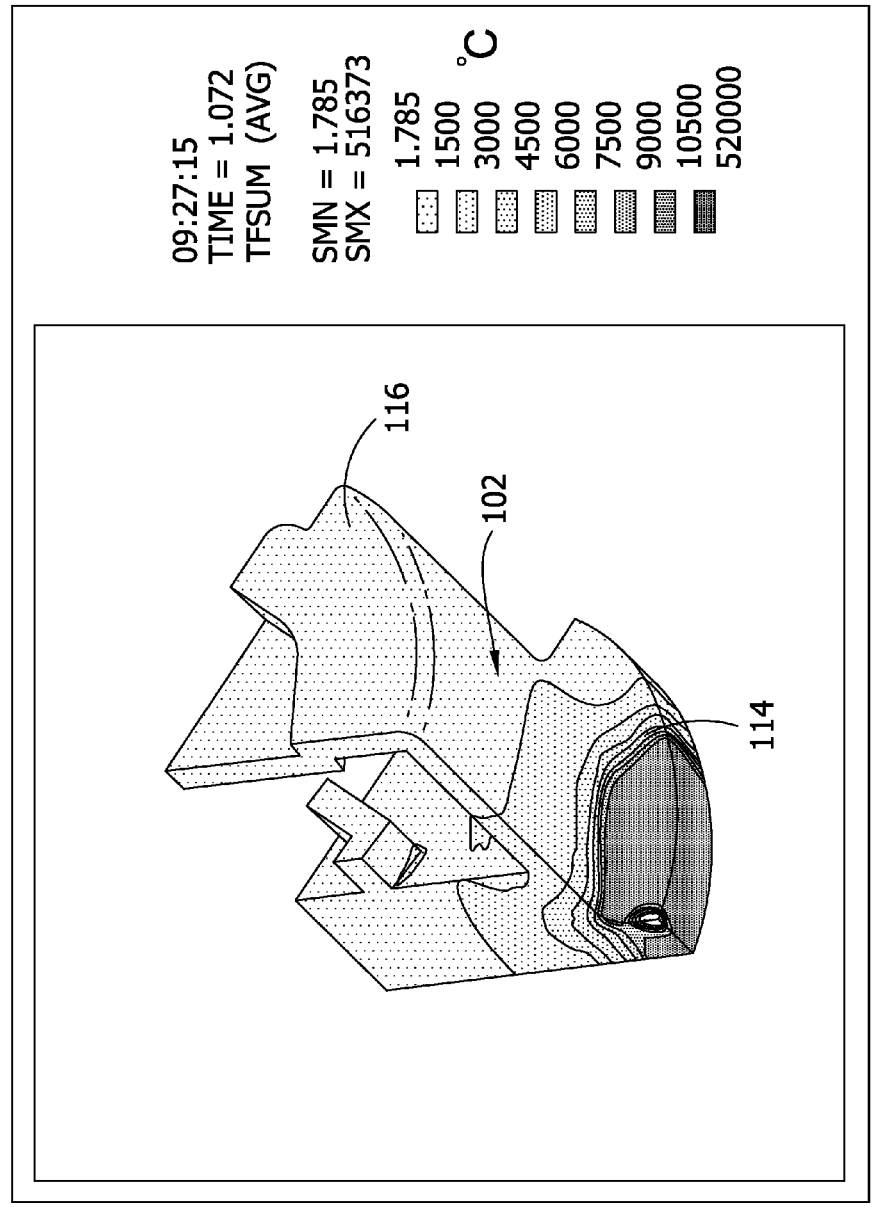
FIG. 11 is a temperature gradient plot for heat flux of a sensor can of the embodiment of the tympanic thermometer shown in FIG. 6 measured at 1.072 seconds after heat has been applied.
Figure 12:
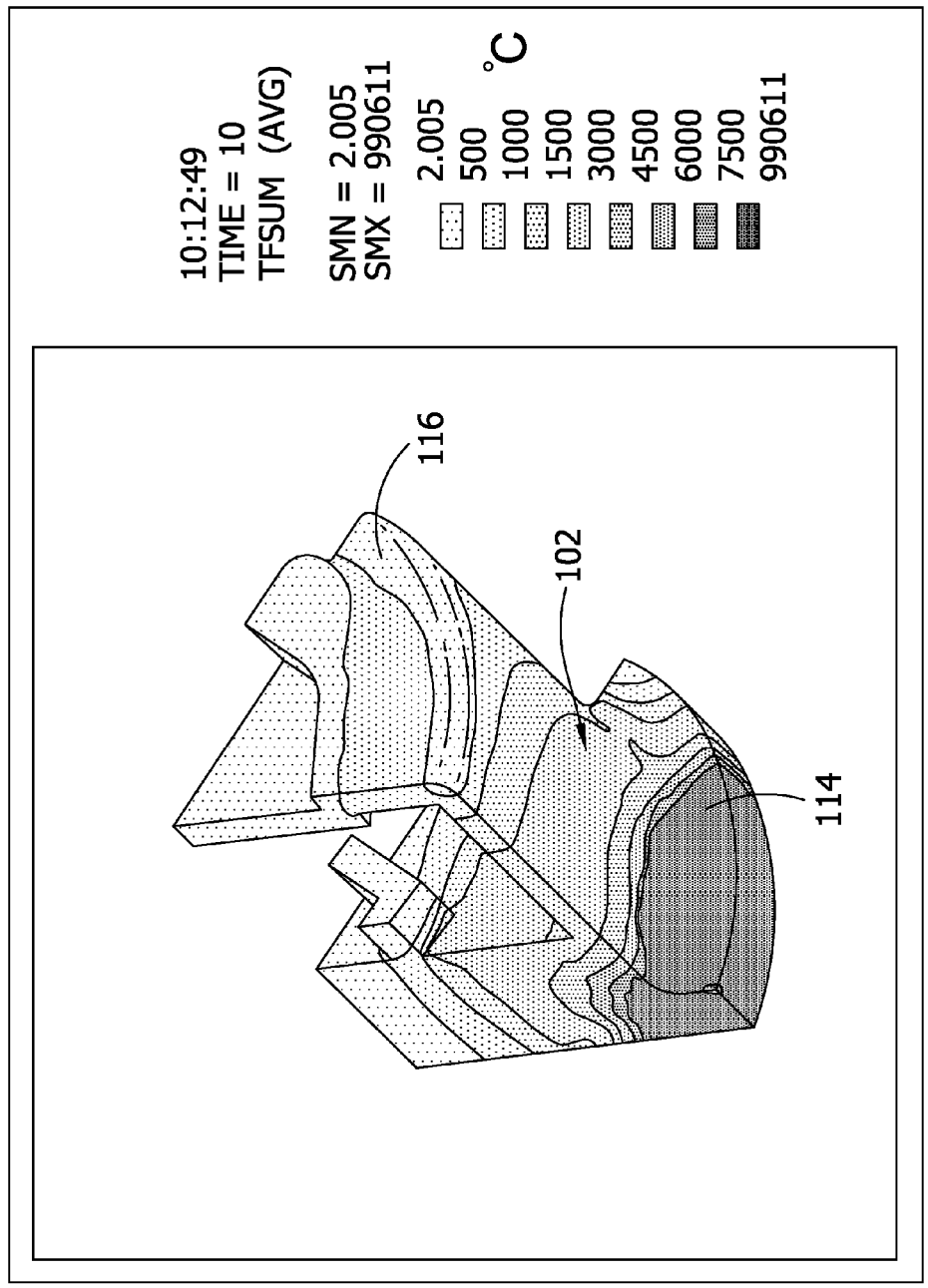
FIG. 12 is a temperature gradient plot for heat flux of the sensor can shown in FIG. 6 measured at 10 seconds after heat has been applied.

FIGS. 6-12 show temperature plots from a simulated temperature reading of the human ear. The data of such were confirmed from actual experimental tests performed on the ear of a subject. FIG. 6 shows a temperature plot of the temperature distribution across the sensor section of can 102 after 1.072 seconds. Areas of focus include the surface where the absorber chip and thermistor 124 (FIG. 4A) are located, the inside top of the sensor can and the inside side of the sensor can. FIG. 7 shows a temperature plot of the temperature distribution across the sensor-section after 3.945 seconds. FIG. 8 shows a temperature plot of the temperature distribution across the sensor section after 7.229 seconds. FIG. 9 shows a temperature plot of the temperature distribution across the sensor section after 10 seconds. FIG. 10 shows a plotted graph of the temperature distribution for the 10 second time transient. As shown from the results of a nodal analysis performed at the top, side internal thermistor 124 (FIG. 4A) of can 102, ($\Delta T$) is substantially constant across the 10 second time transient (that is, ($\Delta T$) essentially tracks the thermistor 124 (FIG. 4A)). As such, temperature accuracy errors do not increase with time as in conventional prior art thermometers. Temperature readings can occur at substantially any time along the plotted graph of FIG. 10. FIG. 11 shows a temperature plot of the temperature gradient plot for heat flux after 1.072 seconds. FIG. 12 shows a temperature plot of the temperature gradient plot for heat flux after 10 seconds.

Figure 13:
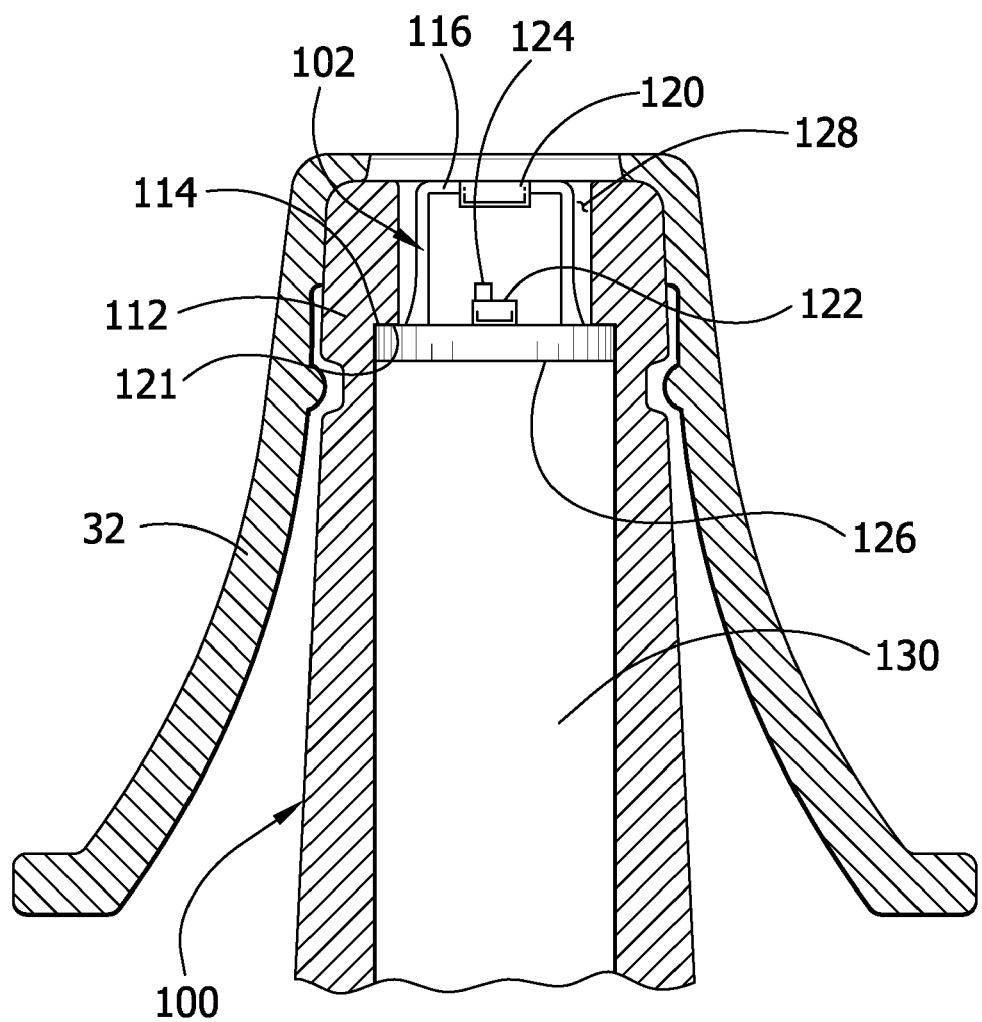
FIG. 13 is a cross-sectional view of a sensor probe of another embodiment.

Referring to FIG. 13, a heat sensing probe is similar to the heat sensing probe 22 of the embodiment illustrated in FIGS. 1-5, therefore, corresponding components will have corresponding reference numbers. The difference between this probe and the prior embodiment is that this probe does not have a sensor housing. The sensor can 102 is preferably free of thermal connection to a thermally conductive structure other than the nozzle 100 that has a mass greater than the mass of the sensor can. Stated another way, the sensor can 102 is preferably free of thermal connection with any metallic object other than the nozzle 100. In fact in the version illustrated in FIG. 13, there is no structure secured to or in contact with a proximal side 126a of the base 126. The nozzle 100 instead defines an air space 130 on the proximal side of the base which acts as a thermal insulator so that heat conducted form the nozzle 100 to the base 126 is not drawn away from the base, but rather is conducted into the sensor can generally so that a thermal gradient between the base 126 (or proximal side of the sensor can 102) and the distal end of the sensor can opposite the base is minimized during the course of measuring temperature in the ear. As used herein, "air space" means a space having no solid structure, but which may be filled with a gas of any kind, or be a vacuum. Instead, the base 126 of the can 102 is secured directly to the nozzle 100 without the need to mount the can on a separate structure, such as a sensor housing. For example, the base 126 may be secured to the directly to the internal ridge 121 of the nozzle 100 using thermally conductive adhesive, such as an epoxy resin sold under the name Stycast® 2850 FT-FR and cured with Catalyst 9. (The trademark Stycast® is owned by National Starch and Chemical Company). The can 102 remains thermally insulated within the nozzle, except for the path of heat transfer, because air below the base 126 of the can within the nozzle 100 acts as an insulator.

It is understood that the base 126 of the can 102 can be secured within the nozzle 100 in other ways. For example, a thermally insulated connector member may be secured directly to the nozzle 100, such as by a thread fastener, friction-fit, snap-fit or other connection, so that it contacts the proximal side of the base 126 of the can 102 and presses the distal side of the base in thermal contact with the internal ridge 121 of the nozzle. A flex circuit (alternatively, wires) from the can 102 run through the connector member and the nozzle 100 (not shown). The can 102 may also be directly secured to the nozzle 100, as described above with regard to the embodiment illustrated in FIG. 13. Other ways of securing the can 102 within the nozzle 100 so that the base 126 of the can is in thermal contact with the nozzle are within the scope of this invention.

Figure 14:
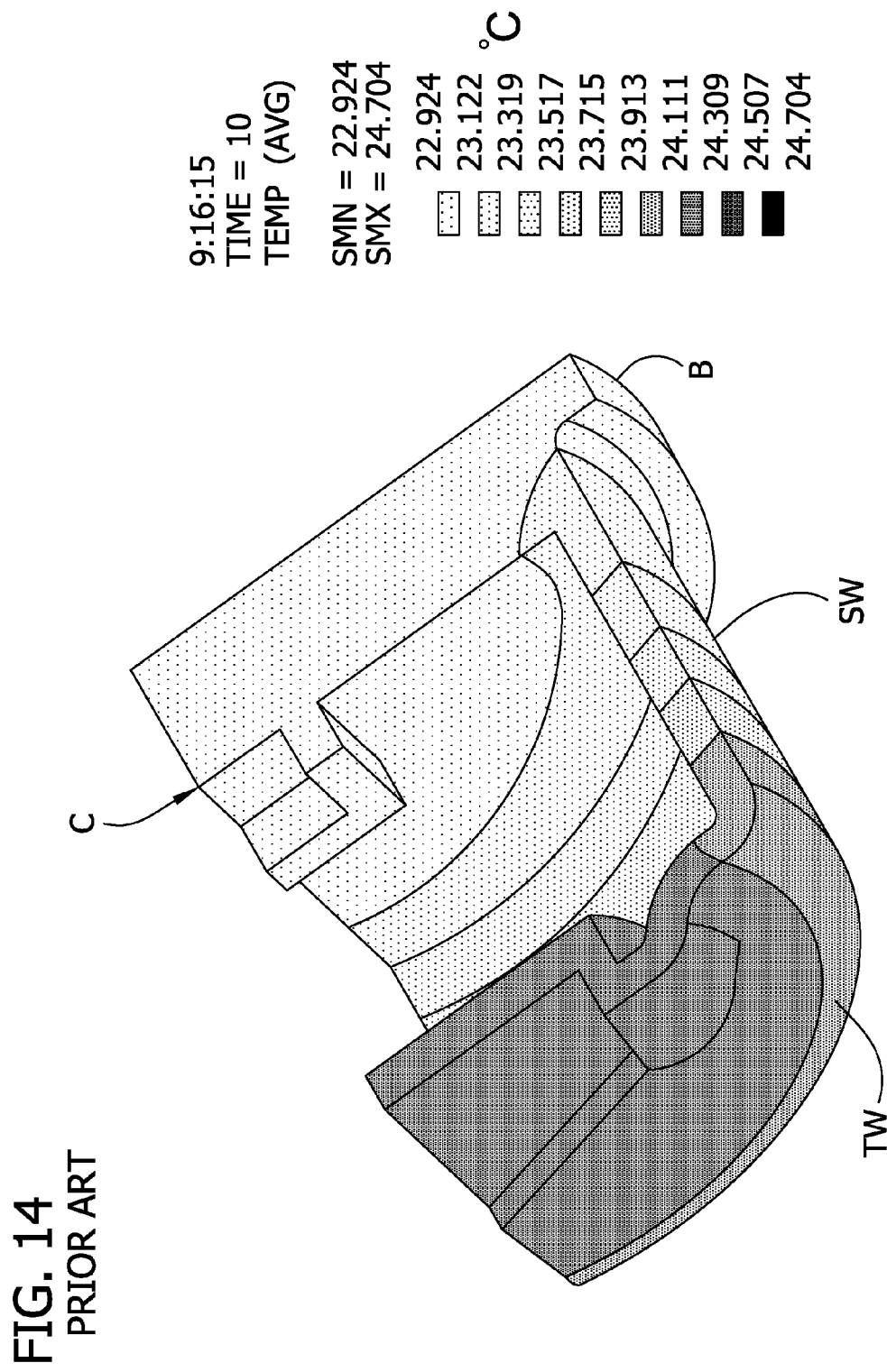
FIG. 14 is a fragmentary section of a sensor can of a tympanic thermometer of the prior art.
Figure 15:
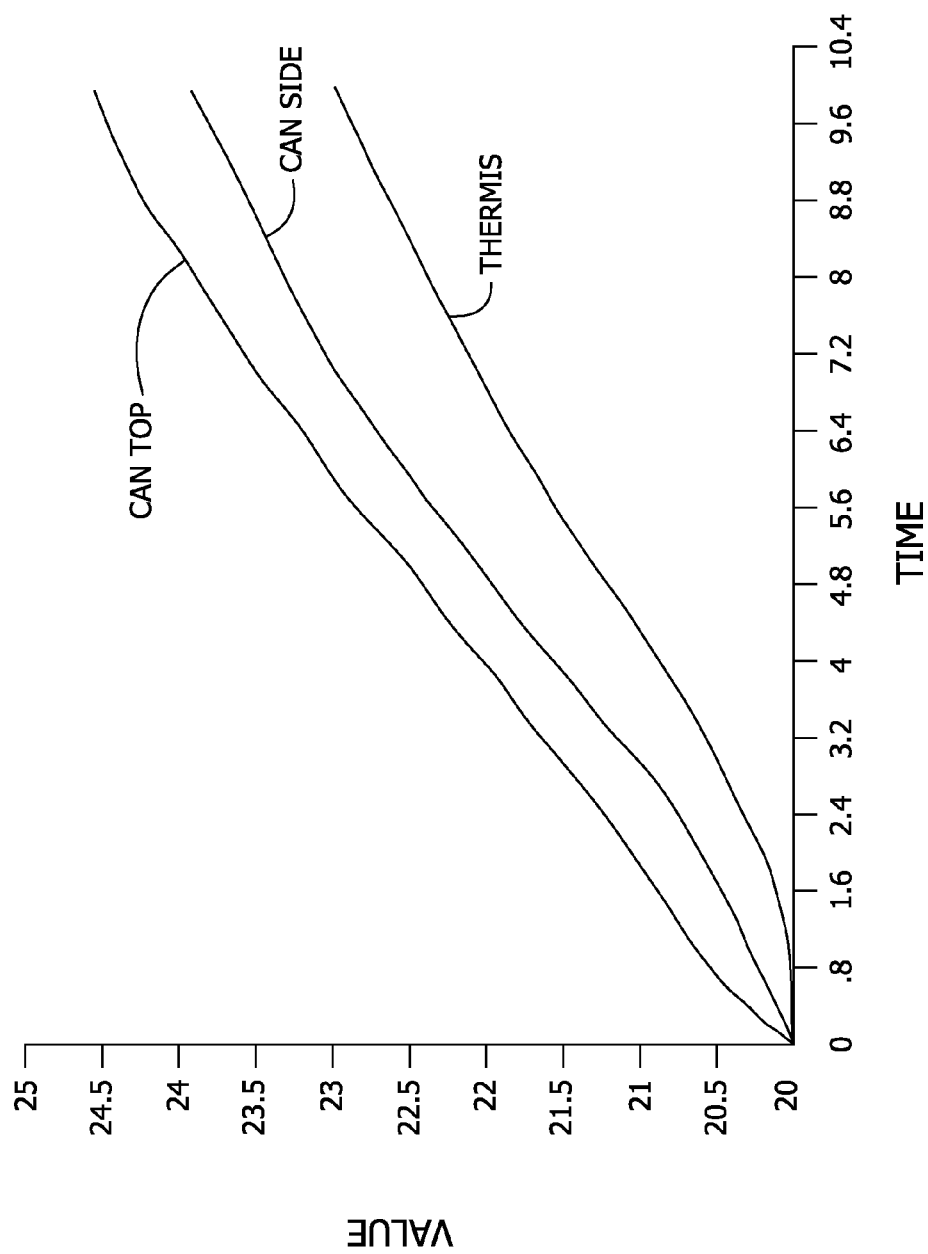
FIG. 15 is a graph showing the time based temperature response of the sensor can of FIG. 14.
Figure 16:
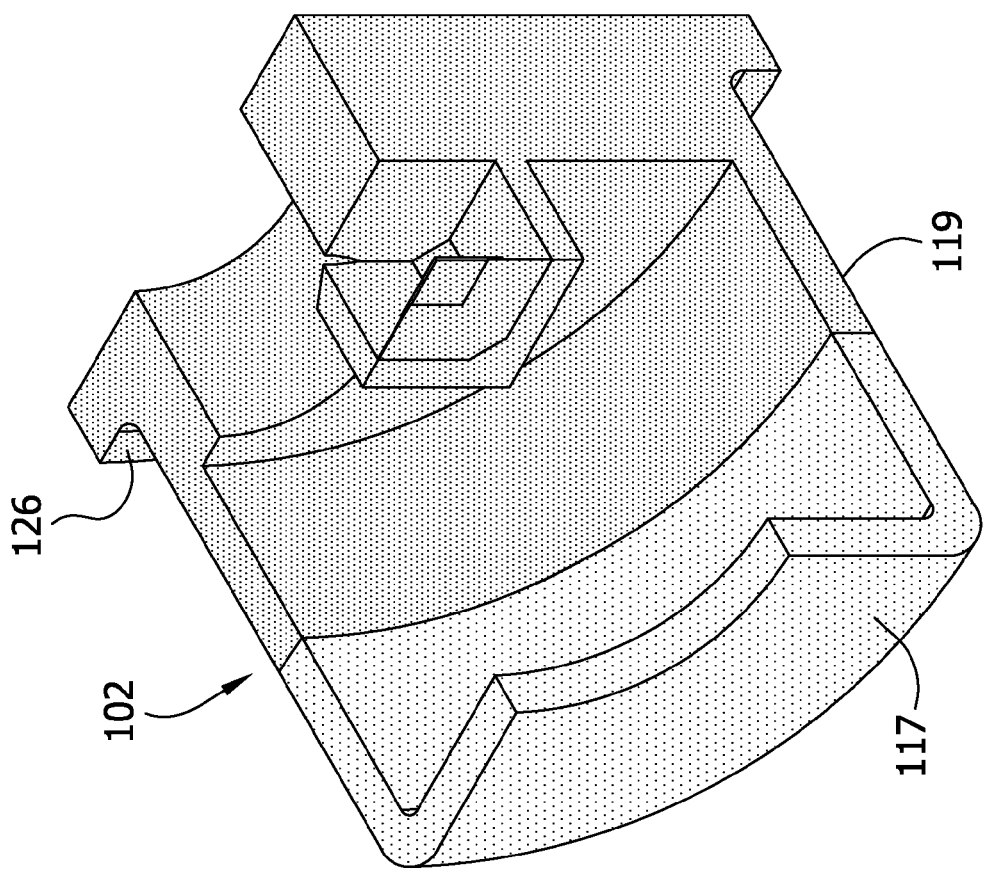
FIG. 16 is a fragmentary section of a sensor can of a tympanic thermometer of the present invention.

Referring now to FIG. 14, a computer model of temperature distribution over a sensor can C in a tympanic thermometer similar to conventional constructions is schematically illustrated. For the computer modeling, temperature nodes were located on a base B of the sensor can C near where the thermistor (not shown) would be located, on the side wall (SW) about halfway up, and on the top wall (TW). The sensor can C was subjected to heat conditions approximating those experienced when the distal end of a tympanic thermometer probe is placed in a human ear. In conventional configurations, a heat sink (not shown) having a high thermal conductivity is in contact with a base B of the sensor can C to draw heat away from the can to avoid heating the can. Thus, the base B of the sensor can C remains relatively stable in temperature throughout the time the thermometer probe is received in the ear. However a distal end (i.e., top wall TW) of the can C opposite the base B is heated by the influx of heat from the tympanic membrane and tissue adjacent to the end of the sensor can opposite the base. As illustrated in FIG. 15, after 1-2 seconds the distal end of the sensor can C already differs substantially from the temperature of the base (e.g., on the order of 1.5 degrees centigrade.

As shown in FIG. 15, the temperatures of the base B of the sensor can C, which corresponds to the temperature of the thermistor, and the temperature of the side wall SW of the can and the top wall TW of the can continue to diverge throughout the ten second interval of the model. This divergence in temperature makes the side wall SW and top wall TW of the sensor can C visible to the infrared sensor. Thus, the infrared sensor is measuring both the temperature differential of the tympanic membrane and the temperature differential of the side and top walls SW, TW. The infrared sensor operates by detecting differences in temperature from its own temperature of objects within its field of view. The thermistor temperature is an indication of the temperature of the infrared sensor. Desirably, the infrared sensor sees the tympanic membrane which is indicative of the core body temperature. Readings from the sensor can side wall SW and top wall TW are not desirable and lead to error in the measurement. Temperature variations on the order of 1.5 degrees centigrade, as shown in the example illustrated in FIGS. 14 and 15 cause significant error in the final temperature reading.

FIGS. 16-19 show results of computer (finite element analysis) modeling for a tympanic thermometer constructed according to the principles of the present invention. In particular, the sensor can base 126 is in thermal contact with the nozzle 100 (not shown in FIG. 16) and thermally isolated from contact with another heat conductive material (such as a heat sink). An arrangement of this type has been previously illustrated in FIG. 4A. Temperature nodes for monitoring temperature were placed in the same locations on sensor can 102 as for the sensor can C illustrated in FIG. 14. The sensor can 102 was subjected to heat conditions corresponding to those when the probe of the thermometer is placed inside the ear. A marked difference in temperature distribution from the example is readily apparent. The distal end (i.e., top wall 117) of the sensor can is heated, as before. Now, the base 126 of the can 102 is also heated so that two heat fronts proceed from the base of the can and the top wall of the can to converge at a side wall 119 of the can. As a result, the difference in temperature between the thermistor and the sensor can top wall 117 and side wall 119 does not vary as greatly as before. Therefore, the can top wall 117 and side wall 119 are relatively invisible to the infrared sensor and produce less error in the temperature signal of the sensor.

Figure 18:
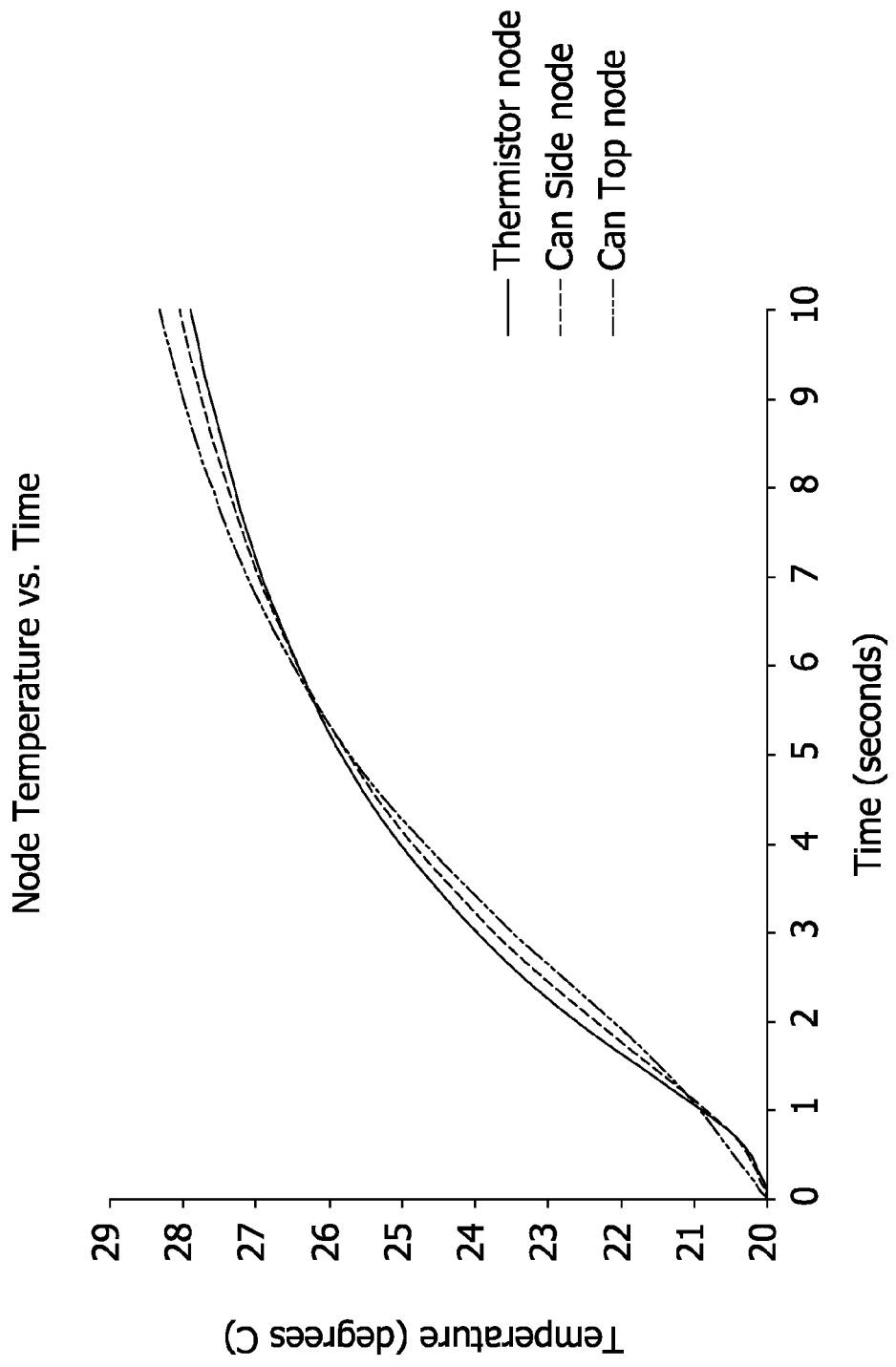
FIG. 18 is a graph of the temperature versus time data of FIG. 17.
Figure 19:
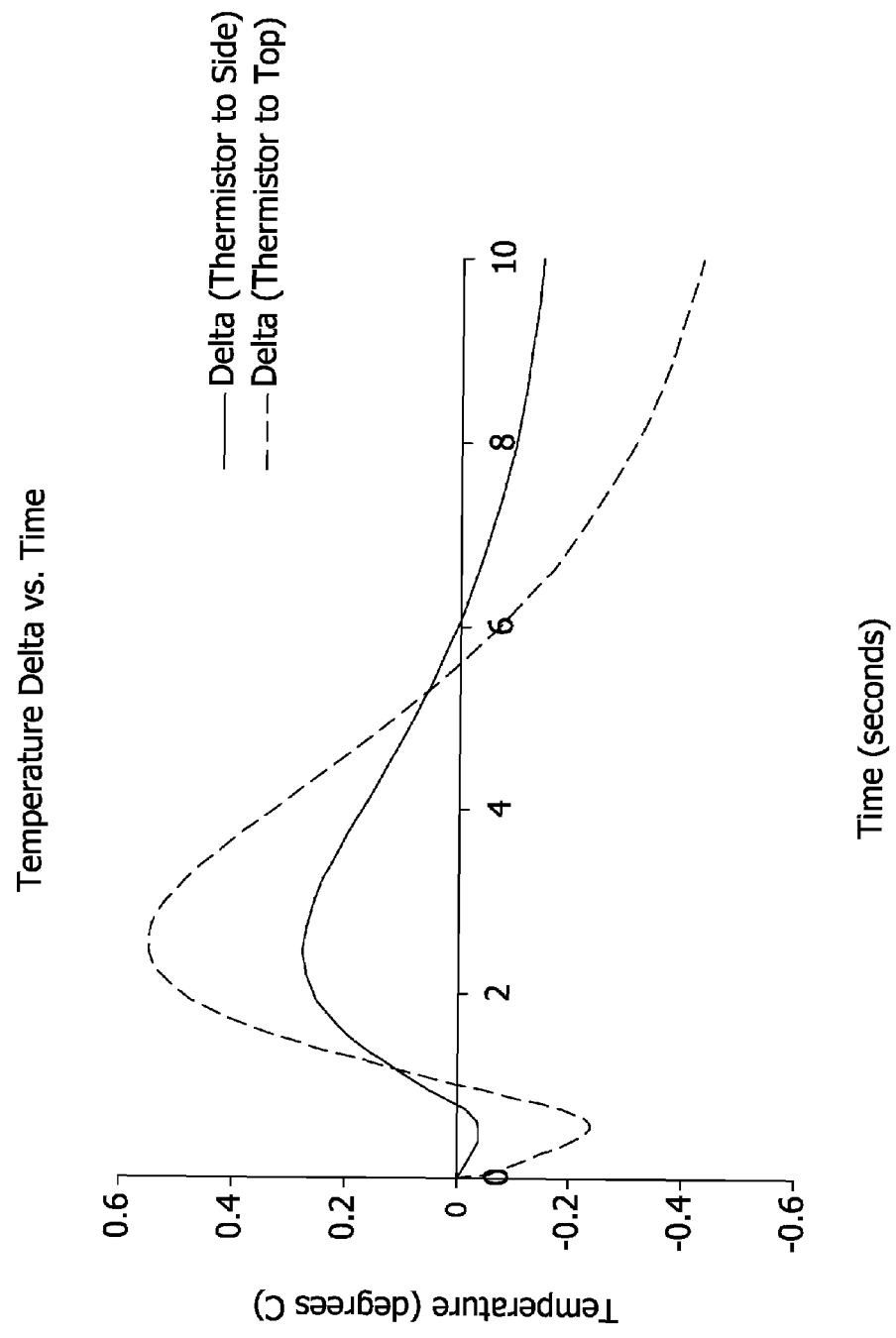
FIG. 19 is a graph of temperature differentials across the sensor can.

As can be seen in the graph of FIG. 18, the temperatures of the base 126 (thermistor), top wall 117 and side wall 119 are closely correlated and repeatedly cross over each other inasmuch as being the greater temperature during the approximately ten second interval of measurement. Initially (e.g., before about one second after the onset of temperature measurement), the can top wall 117 and side wall 119 are somewhat hotter than the base 126 (see FIG. 17). Between one and about six seconds, the base 126 is actually hotter than the can top and side walls 117, 119. Thereafter until the end of the period of about ten seconds, the walls 117, 119 are again somewhat hotter. A graph of the difference in temperature between the base 126 (thermistor) and the sensor can top wall 117 and side wall 119 (respectively) is shown in FIG. 18. The temperature differences remain relatively small (on the order of about 0.5 degrees centigrade or less) throughout the period in which a temperature measurement would be taken. Accordingly, the sensor can walls 117, 119 provide only a very minimal error component to the temperature reading. Moreover, the thermometer is able to operate more accurately over a wider range of ambient temperatures.

Figure 20:
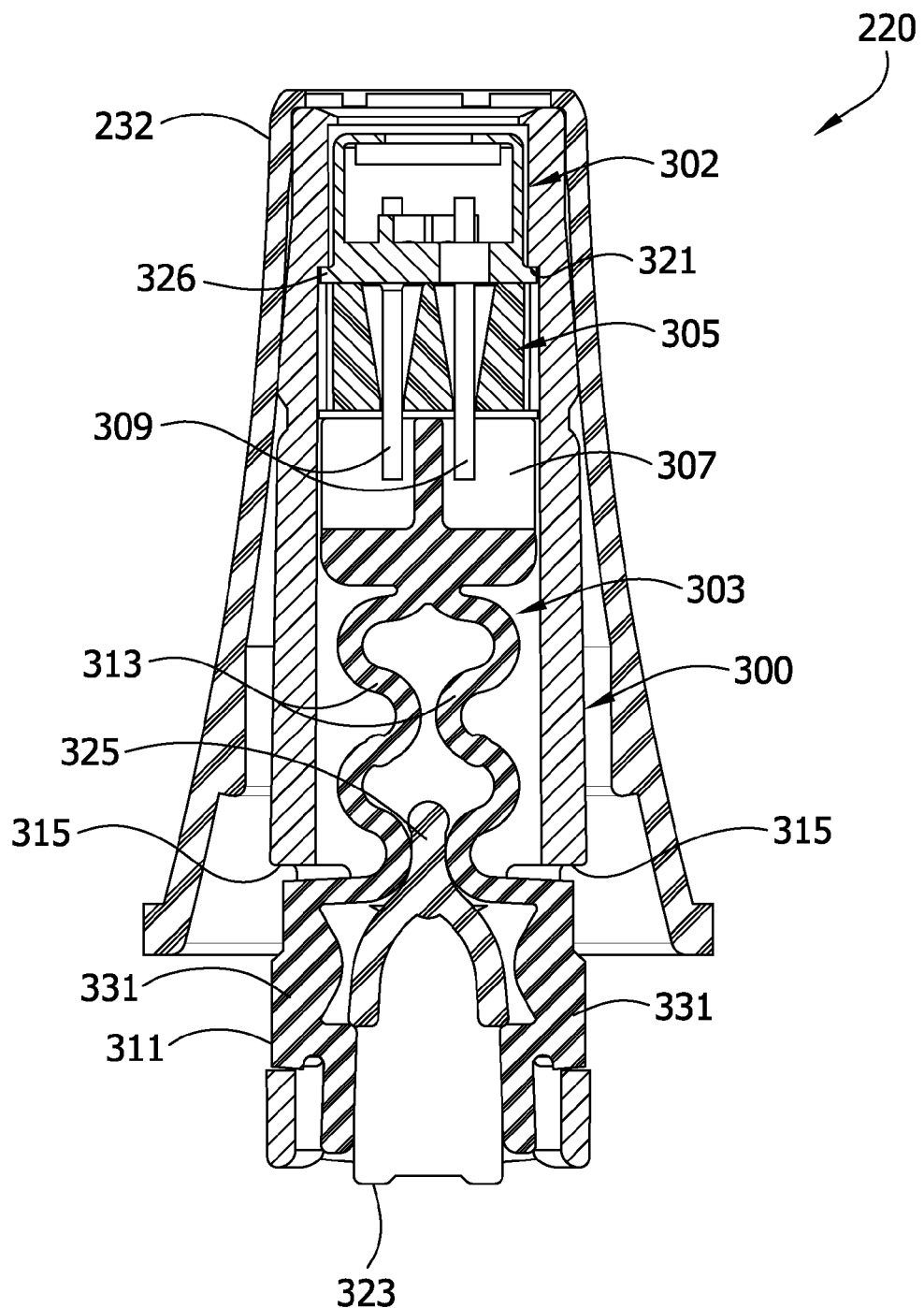
FIG. 20 is a cross-sectional view of a sensor probe of still another embodiment.

A tympanic thermometer 220 of another embodiment is illustrated in FIG. 20. The parts of the tympanic thermometer 220 of FIG. 20 corresponding to the parts of the tympanic thermometers 20 of the prior figures will be indicated by the same reference numerals, plus "200". The tympanic thermometer 220 has a construction similar to the thermometer 20 shown in FIGS. 1-4A, including having a nozzle 300, a sensor can 302 and a probe cover 232 received on the nozzle. However, instead of a sensor housing 104, a spring locator 303 and a spacer 305 made of a suitable thermally insulating material are used to engage and bias a base 326 of sensor can 302 against nozzle 300. The spring locator 303 comprises a cruciform platform 307 that engages the spacer 305 and pushes it against the underside of the base 326 of the sensor can 302. The cross shape of the platform 307 allows clearance for electrical leads 309 extending from the sensor. The platform 307 is connected to a mounting portion 311 of the spring locator 303 by two corrugated spring members 313. The mounting portion 311 is snapped into a pair of windows 315 in the nozzle 300 to lock the spring locator 303 in position in the nozzle. The spring members 313 are deflected from their relaxed positions when the mounting portion 311 is attached to the nozzle 300 so that they bias the spacer 305 to press the base 326 of the sensor can 302 against an annular internal ridge 321 of the nozzle thereby establishing thermal connection between the nozzle and the base. A reinforcing element 323 received inside the mounting portion 311 after it is secured to the nozzle 300 has a nose 325 that is received between the spring members 313 to increase the spring force of the spring members and to reinforce the spring members.

Figure 21:
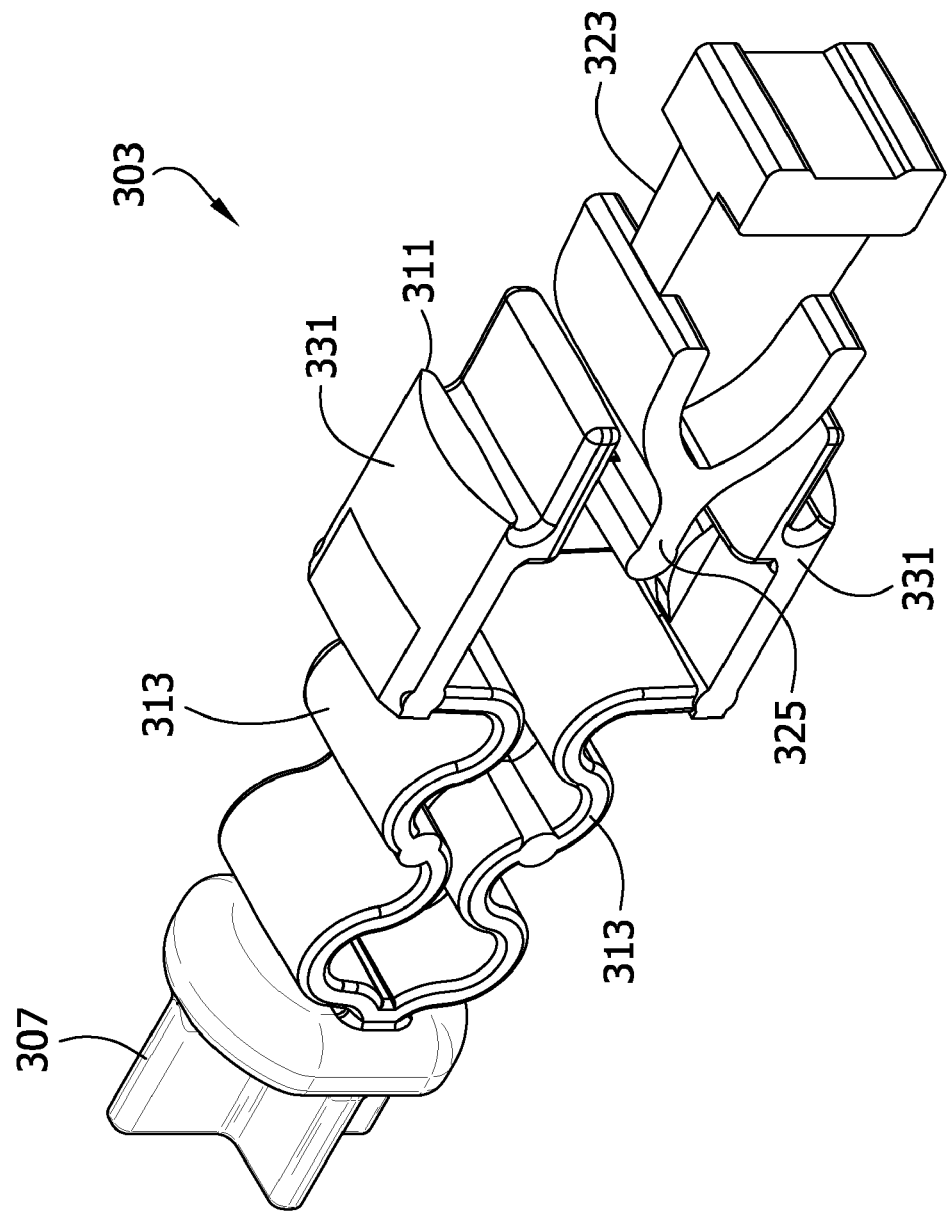
FIG. 21 is a perspective of a spring locator of the sensor probe of FIG. 20.
Figure 22:
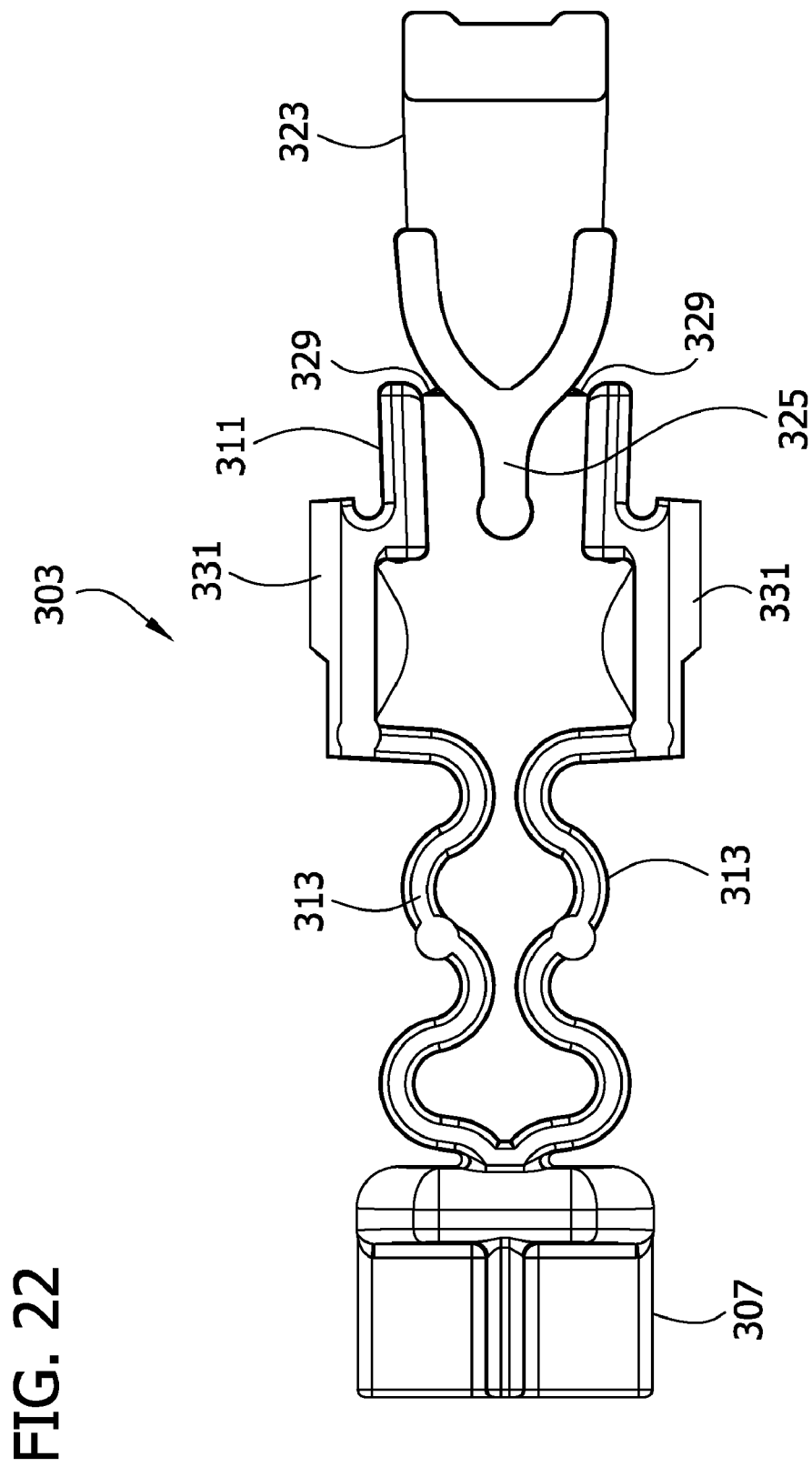
FIG. 22 is a side elevation of the spring locator.

In one embodiment shown in FIGS. 21 and 22, the reinforcing member 323 is initially formed as one piece with the remainder of the spring locator 303 at the proximal end thereof. The reinforcing member 323 is attached by frangible connections 329 to the remainder of the spring locator 303 (see FIG. 22). The frangible connections 329 can be broken after the spring locator 303 is in place with tabs 331 of the mounting portion 311 received in the windows 315 of the nozzle 300 by pushing the mounting portion in a distal direction. After the frangible connections 329 are broken, the reinforcing member 323 is moved to the position shown in FIG. 20 with the nose 325 received between spring members 313 to hold the spring members in a balanced force position for maintaining an optimum spring force holding the can 302 and the spacer 305 against the nozzle 300.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A tympanic thermometer having a proximal end and a distal end, the thermometer comprising:

a thermally conductive nozzle extending from the distal end of the thermometer, the nozzle being located and shaped to receive a probe cover thereon, a sensor can housing temperature sensing electronics for sensing temperature, the sensor can including a base thermally connected to the nozzle to define a path of conductive heat transfer from the nozzle to the base of the can, the sensor can being otherwise free of thermal connection with a thermally conductive structure of greater mass than the sensor can, the thermometer in combination with the probe cover thermally connected to the nozzle as part of the path of conductive heat transfer, wherein heat from outside the thermometer is transferred from the probe cover through the nozzle to the base of the sensor can via the path of conductive heat transfer, and further wherein the probe cover is thermally connected to the nozzle solely at a distal end margin of the nozzle.

2. A tympanic thermometer as set forth in claim 1 wherein the base of the sensor can is secured directly to the nozzle.

3. A tympanic thermometer as set forth in claim 2 wherein the base of the sensor can is secured to an internal ridge of the nozzle.

4. A tympanic thermometer as set forth in claim 3 further comprising a non-thermally conductive retainer secured to the nozzle to sandwich the base of the sensor can between the internal ridge and the retainer.

5. A tympanic thermometer as set forth in claim 3 wherein the base of the sensor can is secured to the nozzle using a thermally-conductive adhesive.

6. A tympanic thermometer as set forth in claim 5 wherein a distal surface of the base of the sensor can is secured to the internal ridge of the nozzle and an opposite proximal surface of the base is free from contact with any structure.

7. A tympanic thermometer as set forth in claim 1 wherein the nozzle defines an air space adjacent a proximal side of the sensor can.

8. A tympanic thermometer as set forth in claim 7 wherein the thermometer is free of structure in thermal connection with the sensor can other than the nozzle.

9. A tympanic thermometer as set forth in claim 1 wherein the nozzle and sensor can are constructed and arranged to define a heat transfer path from the nozzle to the sensor can and to inhibit heat transfer away from the sensor can thereby minimizing a thermal gradient between proximal and distal ends of the sensor can when temperature is measured in the ear.

10. A tympanic thermometer as set forth in claim 1 wherein the nozzle is made of metal and the sensor can is free of thermal connection with a metallic object other than the nozzle.

11. A tympanic thermometer having a proximal end and a distal end, the thermometer comprising:
a thermally conductive nozzle extending from the distal end of the thermometer, the nozzle being located and shaped to receive a probe cover thereon,
a sensor can housing temperature sensing electronics for sensing temperature, the sensor can including a base thermally connected to the nozzle to define a path of conductive heat transfer from the nozzle to the base of the can, the sensor can being otherwise free of thermal connection with a thermally conductive structure of greater mass than the sensor can,
the thermometer further comprising a spring locator disposed in the nozzle and resiliently biasing the sensor can into contact with the nozzle, wherein the spring locator comprises spring members and a reinforcing element engaging the spring members to increase their spring force.

12. A tympanic thermometer as set forth in claim 11 wherein the spring locator is formed of one piece of material.

13. A tympanic thermometer having a proximal end and a distal end, the thermometer comprising:
a thermally conductive nozzle extending from the distal end of the thermometer,
a sensor can housing temperature sensing electronics for sensing temperature, the sensor can including a base thermally connected to the nozzle,
the nozzle defining an air space on a proximal side of the sensor can base to inhibit heat transfer from the sensor can,
the thermometer in combination with the probe cover thermally connected to the nozzle as part of the path of conductive heat transfer, wherein heat from outside the thermometer is transferred from the probe cover through the nozzle to the base of the sensor can via the path of conductive heat transfer, wherein the probe cover is thermally connected to the nozzle solely at a distal end margin of the nozzle.

14. A tympanic thermometer as set forth in claim 13 wherein the base of the sensor can is secured directly to the nozzle.

15. A tympanic thermometer as set forth in claim 14 wherein the base of the sensor can is secured to an internal ridge of the nozzle.

16. A tympanic thermometer as set forth in claim 15 wherein the base of the sensor can is secured to the nozzle using a thermally-conductive adhesive.

17. A tympanic thermometer as set forth in claim 16 wherein a distal surface of the base of the sensor can is secured to the internal ridge of the nozzle and an opposite proximal surface of the base is free from contact with any structure.

18. A tympanic thermometer as set forth in claim 13 wherein the thermometer is free of structure in thermal connection with the sensor can other than the nozzle.

19. A tympanic thermometer as set forth in claim 13 wherein the nozzle and sensor can are constructed and arranged to define a heat transfer path from the nozzle to the sensor can and to inhibit heat transfer away from the sensor can thereby minimizing a thermal gradient between proximal and distal ends of the sensor can when temperature is measured in the ear.

20. A tympanic thermometer as set forth in claim 13 wherein the nozzle is made of metal and the sensor can is free of thermal connection with a metallic object other than the nozzle.

* * * * *